United States Patent [19]

Hill

[11] Patent Number: 5,598,531
[45] Date of Patent: Jan. 28, 1997

[54] METHOD AND APPARATUS FOR PREVENTING "DISEASE" DAMAGE IN COMPUTER SYSTEMS

[75] Inventor: Andrew R. Hill, North Richmond, Australia

[73] Assignees: William Stanley Hill; Questa Mary Hill, both of North Richmond, Australia

[21] Appl. No.: 969,299

[22] PCT Filed: May 13, 1992

[86] PCT No.: PCT/AU92/00213

§ 371 Date: Jan. 28, 1993

§ 102(e) Date: Jan. 28, 1993

[87] PCT Pub. No.: WO92/21087

PCT Pub. Date: Nov. 26, 1992

[30] Foreign Application Priority Data

May 13, 1991 [AU] Australia ................. PK6119

[51] Int. Cl.$^6$ ............. G01R 31/28; G06F 11/00
[52] U.S. Cl. ............................. 395/186; 380/4
[58] Field of Search .................. 395/575, 186, 395/187.01; 371/19; 380/4, 24, 25; 364/280.2, 550

[56] References Cited

U.S. PATENT DOCUMENTS

| 4,685,056 | 8/1987 | Barnsdale, Jr. | 364/200 |
| 4,956,769 | 9/1990 | Smith | 364/200 |
| 4,975,950 | 12/1990 | Lentz | 380/4 |
| 5,121,345 | 6/1992 | Lentz | 364/550 |
| 5,144,659 | 9/1992 | Jones | 380/4 |
| 5,144,660 | 9/1992 | Rose | 380/4 |
| 5,319,776 | 6/1994 | Hile | 395/575 |
| 5,396,609 | 3/1995 | Schmidt | 395/425 |

FOREIGN PATENT DOCUMENTS

| 4099589 | 3/1990 | Australia. |
| 5999390 | 2/1991 | Australia. |
| 2230881 | 10/1990 | United Kingdom. |
| 2231418 | 11/1990 | United Kingdom. |

OTHER PUBLICATIONS

Qasem et al., AI Trends in Virus Control, IEEE Proceedings Apr. 1991, pp. 99–103.

*Primary Examiner*—Robert W. Beausoliel, Jr.
*Assistant Examiner*—Glenn Snyder
*Attorney, Agent, or Firm*—Eliot S. Gerber

[57] ABSTRACT

A method and apparatus are disclosed which act to prevent damage to stored data through the operation of a computer virus. The apparatus is preferably a plug-in card insertable to occupy a number of address locations within a computer system to be protected. At BIOS initialization of the computer system, the apparatus alters interrupt pointers, stored in RAM, to specific ROM functions, to point to locations within the apparatus. The apparatus can then monitor relevant interrupt requests for data change instructions wherein if data changes are intended, warning messages are provided to the computer user, who can then decide to continue the operation, or to abort which can prevent viral damage to stored data. In an alternative configuration, selected address locations can be continually monitored and the system shut down via a hardware reset in the event of unauthorized address location access.

32 Claims, 43 Drawing Sheets

DOS Int20h Intercept

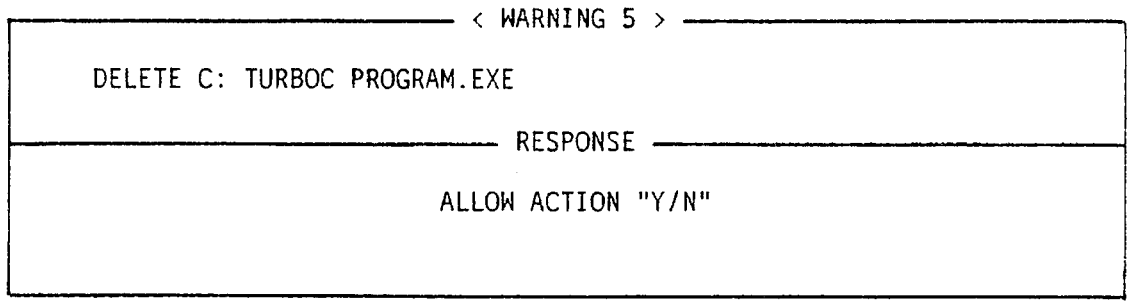
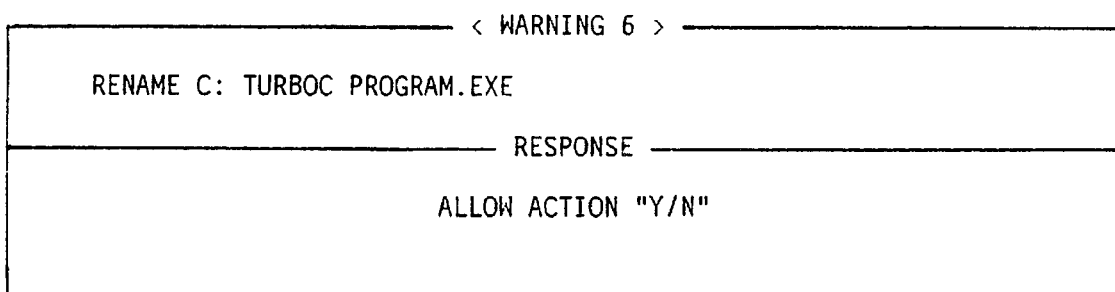
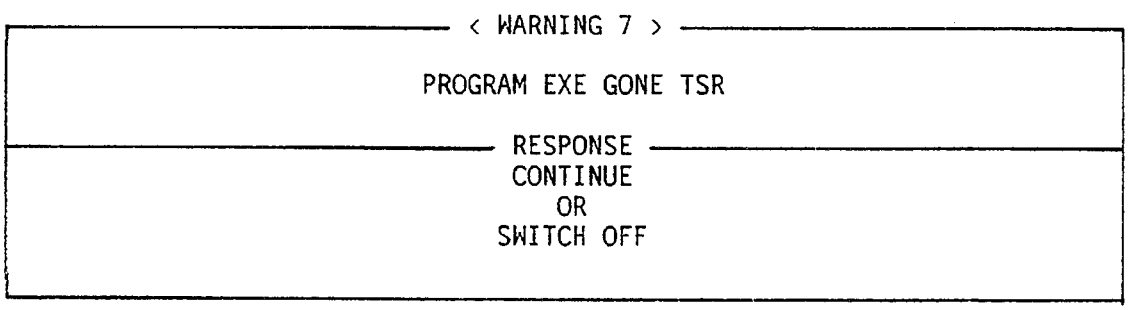
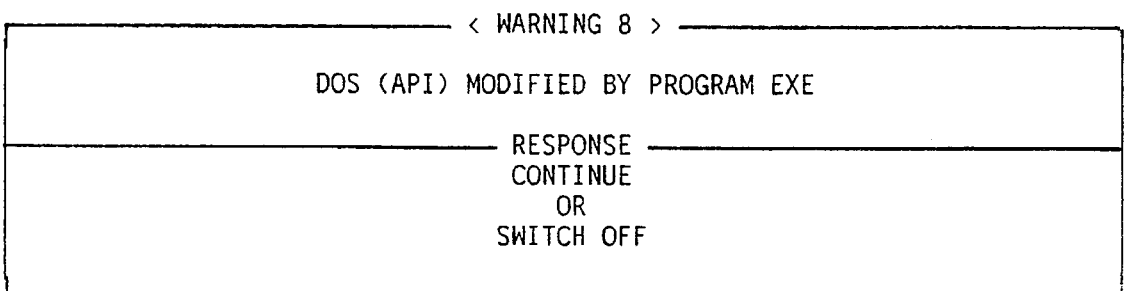

FIG. 26

| STATUS | |||
|---|---|---|---|
| CURRENT PROTECTION STATUS<br>F1 H/DISK LOW LEVEL  ON<br>F2 F/DISK LOW LEVEL  ON<br>F3 HIGH LEVEL (API)  ON | HIGH LEVEL (API) FILTER:-<br>1. SYS   2. COM   3. EXE<br>4. OV*   5. X*    6. DRV<br>7. BIN   8. UUU   9. UUU |||
| F4 DIRECTORY MONITOR ON | F5 CUSTOM || F6 DEFAULT |
| ESC ||||

FIG. 27

──── < WARNING 9 > ────

KEYBOARD LOCKED

──── RESPONSE ────

ENTER PASSWORD

FIG. 28

──── < WARNING 10 > ────

DIRECTORY  ?

──── RESPONSE ────

CONTINUE
OR
SWITCH OFF

FIG. 29

──── < WARNING 11 > ────

TERMINATED V

──── RESPONSE ────

```
┌─────────────────────────────────────────────────────────────────┐
│                        SET-UP "1"                               │
├────────┬─────────┬──────┬──────┬───────┬─────┬──────┬─────┬─────┤
│PASSWORD│(API) EXT│EXEMPT│ TSR  │L/LEVEL│DRIVE│ MISC │TOOLS│QUIT │
└────────┴─────────┴──────┴──────┴───────┴─────┴──────┴─────┴─────┘

PASSWORD

┌─────────────────────────┐
                    │   SET ACCESS PASSWORD   │
                    │   SET VGSETUP PASSWORD  │
                    └─────────────────────────┘

ESC to Menu
```

FIG. 36

```
┌─────────────────────────────────────────────────────────────────┐
│                        SET-UP "2"                               │
├────────┬─────────┬──────┬──────┬───────┬─────┬──────┬─────┬─────┤
│PASSWORD│(API) EXT│EXEMPT│ TSR  │L/LEVEL│DRIVE│ MISC │TOOLS│QUIT │
└────────┴─────────┴──────┴──────┴───────┴─────┴──────┴─────┴─────┘

CHANGE ACCESS PASSWORD

┌─────────────────────────────────────────┐
          │ ENTER NEW PASSWORD        :             │
          │ ENTER NEW PASSWORD AGAIN:               │
          │ Your new password has been accepted !!  │
          └─────────────────────────────────────────┘

ESC to Menu
```

FIG. 37

```
+---------------------------------------------------------------+
|                         SET-UP "3"                            |
+--------+---------+------+---+-------+-----+----+-----+--------+
|PASSWORD|(API) EXT|EXEMPT|TSR|L/LEVEL|DRIVE|MISC|TOOLS| QUIT   |
+--------+---------+------+---+-------+-----+----+-----+--------+

CHANGE SETUP PASSWORD
        +-----------------------------------------+
        | ENTER NEW PASSWORD       :              |
        | ENTER NEW PASSWORD AGAIN:               |
        | Your new password has been accepted !!  |
        +-----------------------------------------+

ESC to Menu
```

FIG. 38

```
+---------------------------------------------------------------+
|                         SET-UP "4"                            |
+--------+---------+------+---+-------+-----+----+-----+--------+
|PASSWORD|(API) EXT|EXEMPT|TSR|L/LEVEL|DRIVE|MISC|TOOLS| QUIT   |
+--------+---------+------+---+-------+-----+----+-----+--------+

LOW & HIGH LEVEL CONTROLS WITH HIGH LEVEL (API) FILTER

+----------------------------+--------------------------------+
   | CURRENT PROTECTION STATUS  | HIGH LEVEL (API) FILTER:-      |
   +----------------------------+--------------------------------+
   | F1 H/DISK LOW LEVEL    ON  | 1. ZZZ    2. ZZZ    3. ZZZ     |
   | F2 F/DISK LOW LEVEL    ON  | 4. ZZZ    5. ZZZ    6. ZZZ     |
   | F3 HIGH LEVEL (API)    ON  | 7. ZZZ    6. ZZZ    9. ZZZ     |
   +----------------------------+----------------+---------------+
   | F4 DIRECTORY MONITOR   ON  | F5 CUSTOM      | F6 DEFAULT    |
   +----------------------------+----------------+---------------+

ESC to Menu
```

FIG. 39

```
┌─────────────────────────────────────────────────────────┐
│                        SET-UP "5"                        │
├────────┬─────────┬───────┬───┬───────┬─────┬────┬─────┬────┤
│PASSWORD│(API) EXT│EXEMPT │TSR│L/LEVEL│DRIVE│MISC│TOOLS│QUIT│
└────────┴─────────┴───────┴───┴───────┴─────┴────┴─────┴────┘

FILE NAMES EXEMPT FROM (API) FILTER

┌────────────────────────────────────┐
        │   1. CONFIG  . SYS    11.     .    │
        │   2.         .        12.     .    │
        │   3.         .        13.     .    │
        │   4.         .        14.     .    │
        │   5.         .        15.     .    │
        │   6.         .        16.     .    │
        │   7.         .        17.     .    │
        │   8.         .        18.     .    │
        │   9.         .        19.     .    │
        │  10.         .        20.     .    │
        └────────────────────────────────────┘

ESC to Menu
```

FIG. 40

```
┌─────────────────────────────────────────────────────────┐
│                        SET-UP "6"                        │
├────────┬─────────┬───────┬───┬───────┬─────┬────┬─────┬────┤
│PASSWORD│(API) EXT│EXEMPT │TSR│L/LEVEL│DRIVE│MISC│TOOLS│QUIT│
└────────┴─────────┴───────┴───┴───────┴─────┴────┴─────┴────┘

FILE NAMES APPROVED FOR TSR & INT-21

┌────────────────────────────────────┐
        │   1. MOUSE   . COM    11.     .    │
        │   2.         .        12.     .    │
        │   3.         .        13.     .    │
        │   4.         .        14.     .    │
        │   5.         .        15.     .    │
        │   6.         .        16.     .    │
        │   7.         .        17.     .    │
        │   8.         .        18.     .    │
        │   9.         .        19.     .    │
        │  10.         .        20.     .    │
        └────────────────────────────────────┘

ESC to Menu
```

FIG. 41

```
┌─────────────────────────────────────────────────────────────┐
│                         SET-UP "7"                          │
├──────────┬───────────┬───────┬───┬───────┬─────┬────┬─────┬────┤
│ PASSWORD │ (API) EXT │EXEMPT│TSR│L/LEVEL│DRIVE│MISC│TOOLS│QUIT│
└──────────┴───────────┴───────┴───┴───────┴─────┴────┴─────┴────┘

FILE NAMES GRANTED WITH L/LEVEL ACCESS

┌─────────────────────────┐
                  │  1.    .      11.    .  │
                  │  2.    .      12.    .  │
                  │  3.    .      13.    .  │
                  │  4.    .      14.    .  │
                  │  5.    .      15.    .  │
                  │  6.    .      16.    .  │
                  │  7.    .      17.    .  │
                  │  8.    .      18.    .  │
                  │  9.    .      19.    .  │
                  │ 10.    .      20.    .  │
                  └─────────────────────────┘

ESC to Menu
```

FIG. 42

```
┌─────────────────────────────────────────────────────────────┐
│                         SET-UP "8"                          │
├──────────┬───────────┬───────┬───┬───────┬─────┬────┬─────┬────┤
│ PASSWORD │ (API) EXT │EXEMPT│TSR│L/LEVEL│DRIVE│MISC│TOOLS│QUIT│
└──────────┴───────────┴───────┴───┴───────┴─────┴────┴─────┴────┘

DRIVE TABLE

┌──────────────────────────────────────────────────┐
     │ F1 GRANT BOOTUP STATUS TO FLOPPY DISKETTES   YES │
     ├──────────────────────────────────────────────────┤
     │ F2 ENABLE THE FLOPPY DRIVE SUB-SYSTEM (A-B)  YES │
     ├──────────────────────────────────────────────────┤
     │ F3 ENABLE PHYSICAL HARD DRIVES (D-Z)         YES │
     └──────────────────────────────────────────────────┘

ESC to Menu
```

FIG. 43

SET-UP "9"

| PASSWORD | (API) EXT | EXEMPT | TSR | L/LEVEL | DRIVE | MISC | TOOLS | QUIT |
|---|---|---|---|---|---|---|---|---|

MISCELLANEOUS SETTINGS

| | |
|---|---|
| F1 PRINT WARNING MESSAGES OVER GRAPHICS | NO |
| F2 REQUEST PASSWORD ON EACH BOOT SEQUENCE | YES |
| F3 RESTRICT USER FROM LOW LEVEL WRITES | NO |
| F4 RESTRICT USER FROM MEMORY INVASION | NO |
| F5 RESTRICT USER FROM CMOS MEMORY ADJUSTMENTS | NO |
| F6 RESTRICT USER FROM MODIFYING PROTECTED FILES | NO |
| F7 RESTRICT USER FROM REN/DEL PROTECTED FILES | NO |
| F8 PROGRAMMERS MODE ONLY (ALLOW RENAME/DELETE) | NO |
| F9 MONITOR CMOS MEMORY (286/386/486 etc.) | NO |
| F0 MONITOR CREATE BY DELETING EXISTING FILE | YES |
| TB MONITOR UNCONVENTIONAL EXIT/SPAWN PROCEDURES | NO |

ESC to Menu

FIG. 44

METHOD AND APPARATUS FOR PREVENTING "DISEASE" DAMAGE IN COMPUTER SYSTEMS

FIELD OF THE INVENTION

The present invention relates to computer systems and, in particular, discloses a method by which "disease" damage to data stored within the computer system can be prevented.

BACKGROUND ART

Computer viruses are known in the art and represent one form of computer disease. Viruses are essentially computer programs that have the ability of infecting the memory of computer systems, deleting or augmenting that memory, as well as being able to replicate themselves via use of communication lines or portable memory such as floppy disks. It has been found that most computer viruses are transmitted either in the sale of new floppy disks, or through the swapping of floppy disks, and by the interconnection of computers using modems and networks. If a computer system becomes infected with a computer virus, the user has the option of purchasing software that is able to identify the virus, so that the infection can be eradicated. In such a process, it is required to establish the viral "fingerprint" which gives the computer user an indication as to how the virus works and how to prepare software that will actually combat the viral fingerprint. However, in destroying the virus, it is sometimes possible to destroy program data as well.

However, to establish a viral fingerprint through the loading of appropriate software, it is necessary, in personal computers, for the disk operating system (DOS) to be operating which also allows the computer virus to operate. It has been found, that some computer viruses actually attack the software attempting to establish the viral fingerprint.

At the date of this application, there are approximately 1600 viruses present throughout the world. One software manufacturer has established 475 viral fingerprints and it will be apparent to those skilled in the art, therefore, that many computer viruses cannot be effectively treated.

Many computer viruses are particularly intelligent and one such virus, named STONE, has been identified as being able to be changed by human re-enginerring so as to alter its viral fingerprint. At present, the STONE virus is also known in two mutated forms, STONE I and STONE II. There are many self-mutating (stealth) viruses, such as "1260", "V800" and "DARK AVENGER" strains. Another intelligent virus is known as FRIDAY THE 13TH and, as implied by its name, this virus only becomes active on that particular date. Such an operation is readily available as most computer systems include a CMOS real-time clock which the intelligent virus can monitor and enable itself on a particular day.

Other forms of computer "disease" take the form of "Trojans", "worms" and "logic bombs". Trojans and logic bombs have the effect of infecting a computer system, sometimes under the guise of something else (as in the Trojan Horse), and "exploding" in such a manner that blocks of data stored in memory are destroyed irretrievably. As their names imply, they have a once-only function. Worms have the effect of infiltrating many memory locations in a computer system and generally cause nuisance effects.

For convenience, throughout this specification computer viruses, worms, trojans, logic bombs, and the like, are grouped together as "diseases", but where applicable, references made to "viruses", because of that terms acceptance in the art, are to be considered references to "diseases" in general.

It is an object of the present invention to substantially overcome, or ameliorate the above mentioned difficulties through provision of a means by which actual damage caused by computer diseases, can be prevented. It will be apparent to those skilled in the art that disease infection of a computer system is generally not preventable, as the disease software is merely data and, when read from a floppy disk or via a network, the computer system sees the disease as merely one small section of data within an entire data transfer.

SUMMARY OF THE INVENTION

In accordance with one aspect of the present invention there is disclosed a method of preventing disease damage to data stored at one or more memory locations in a computer system, said method comprising the steps of determining an advance step or steps required to access said memory location(s), continuously monitoring the operation of said computer system to determine if one of said advance step(s) is undertaken, and before the operation of said computer system continues, in the event that one or more of said advance steps is undertaken, checking an intended action to follow said undertaken advance step to determine if said intended action is permitted.

In accordance with another aspect of the present invention there is disclosed a method of preventing disease damage in a computer system, said method comprising the steps of determining which interrupt vectors of said system are accessed for memory manipulations, amending pointers to said interrupt vectors to point to a corresponding number of dummy memory locations, and monitoring control instructions as they are loaded into said dummy locations to determine if said instructions are to implement alteration or deletion of memory whereby if said instructions are such that an alteration or deletion of memory will be caused, further processing is suspended and a message is provided to a user of said system demanding action so as to prevent or allow further processing, the prevention of further processing thereby preventing unintentional alteration or deletion of said memory.

In accordance with another aspect of the present invention there is disclosed a method for preventing disease damage to data stored at one or more memory locations in a computer system, said method comprising the steps of monitoring said location(s) for an attempted access threat and interrupting the operation of said system upon detection of at least one said attempted access.

BRIEF DESCRIPTION OF THE DRAWINGS

A preferred embodiment of the present invention will now be described with reference to the drawings in which:

FIG. 18–33 show various warning messages issued to the user by the circuit of FIG. 1;

FIGS. 36 to 48 show various configuration setup menus.

BEST AND OTHER MODES FOR CARRYING OUT THE INVENTION

Figure 1:
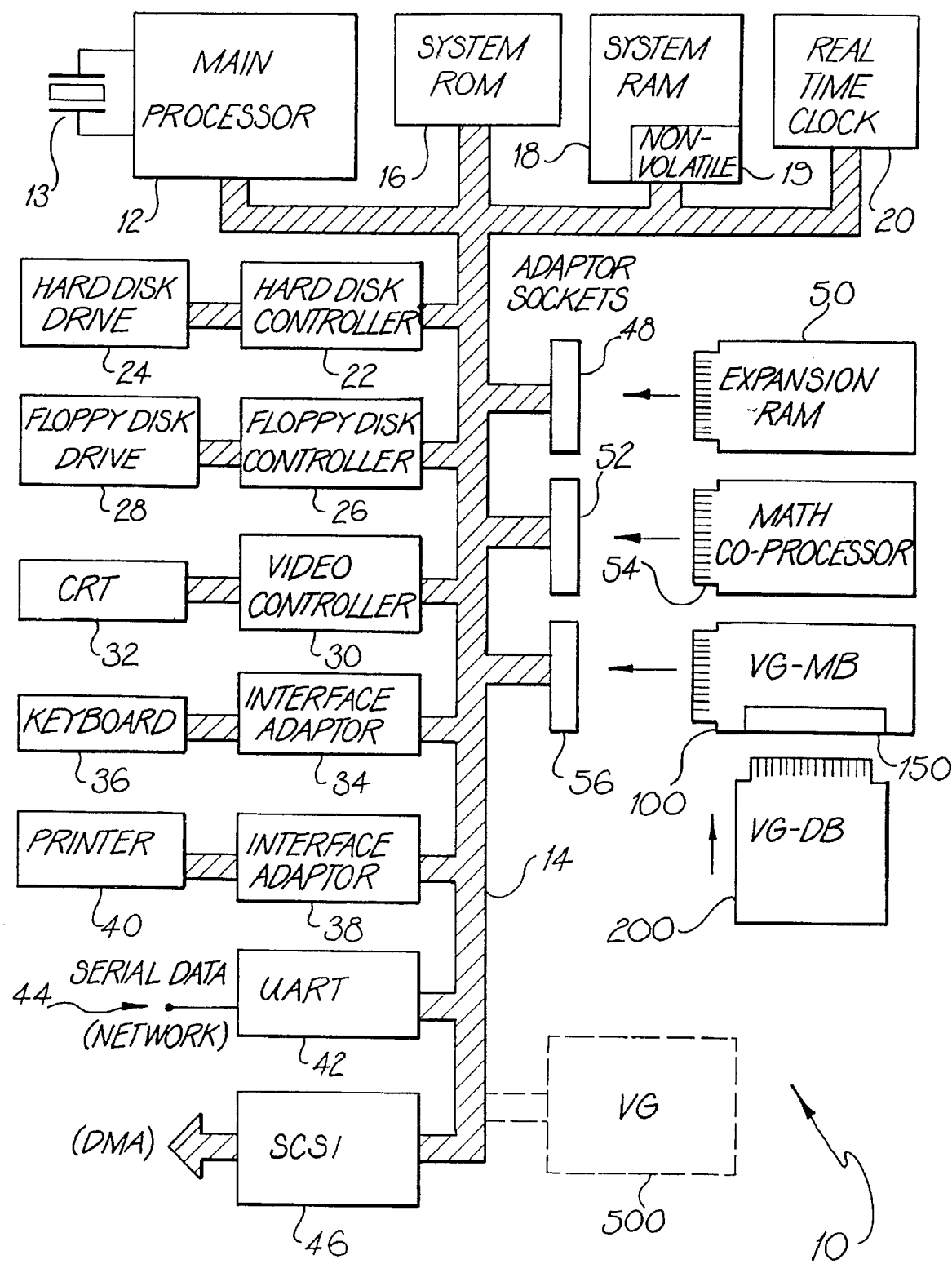
FIG. 1 is a block diagram representation of a computer system incorporating the preferred embodiment.

Referring to FIG. 1, a computer system 10 is shown which includes a main processor 12 connected to other components within the system 10 via a system bus 14 having generally separate or separable data, address and control buses (seen in later FIGS.). Connected to main processor 12 is a crystal 13 which acts as a system clock.

Connected to the bus 14 are the major components of the system 10 which include a system ROM 16, a system RAM 18, a real-time clock 20, a hard disk controller 22 connected to a hard disk drive 24, a floppy disk controller 26 connected to a floppy disk drive 28, a video controller 30 connected to a cathode ray tube (CRT) 32, an interface adapter 34 connected to a keyboard 36, an interface adapter 38 connected to a printer 40, a universal asynchronous receiver transmitter (UART) 42 which supplies a serial data port 44, and an SCSI port 46 which permits direct memory access (DMA) to the bus 14. Generally, the system RAM 18 can comprise a non-volatile portion 19 usually formed of CMOS memory having a battery backup configuration. This permits permanent storage in RAM.

Also connected to the bus 14 are three adaptor sockets 48, 52, 56. Generally, there are usually 3 to 8 sockets. Insertable into the sockets 48, 52, 56 are printed circuit cards and the like which permits specific applications of hardware within the computer system 10. As seen in FIG. 1, an expansion RAM board 50 is insertable into the socket 48 and math co-processor 54 is insertable into the socket 52. Other examples are VGA cards, modems permitting connection to telephone lines and the like.

Each of the abovementioned components perform their normal function and enable a user to operate the computer system 10 in the usual manner.

Also seen in FIG. 1, is a virus protection device motherboard (VG-MB) 100 which is insertable into the adaptor socket 56 and which includes hardware and software components which permit prevention of damage to computer memory within the system 10 as well as within the VG-MB 100, through the operation of computer visuses. Also seen is a virus protection device daughterboard (VG-DB) 200 which in this embodiment is insertable into a connector socket 150 in the VG-MB 100. The VG-MB 200 supplements the viral protection capability of the system 10. Alternatively, the VG-DB 200 can be connected into a further adaptor socket (not illustrated) directly to the bus 14. In an alternative configuration, both the VG-MB 100 and VG-DB 200 can be incorporated into a single circuit 500 (shown i phantom in FIG. 1) which is integral with the computer system 10 and directly connects to the bus 14.

Figure 2:
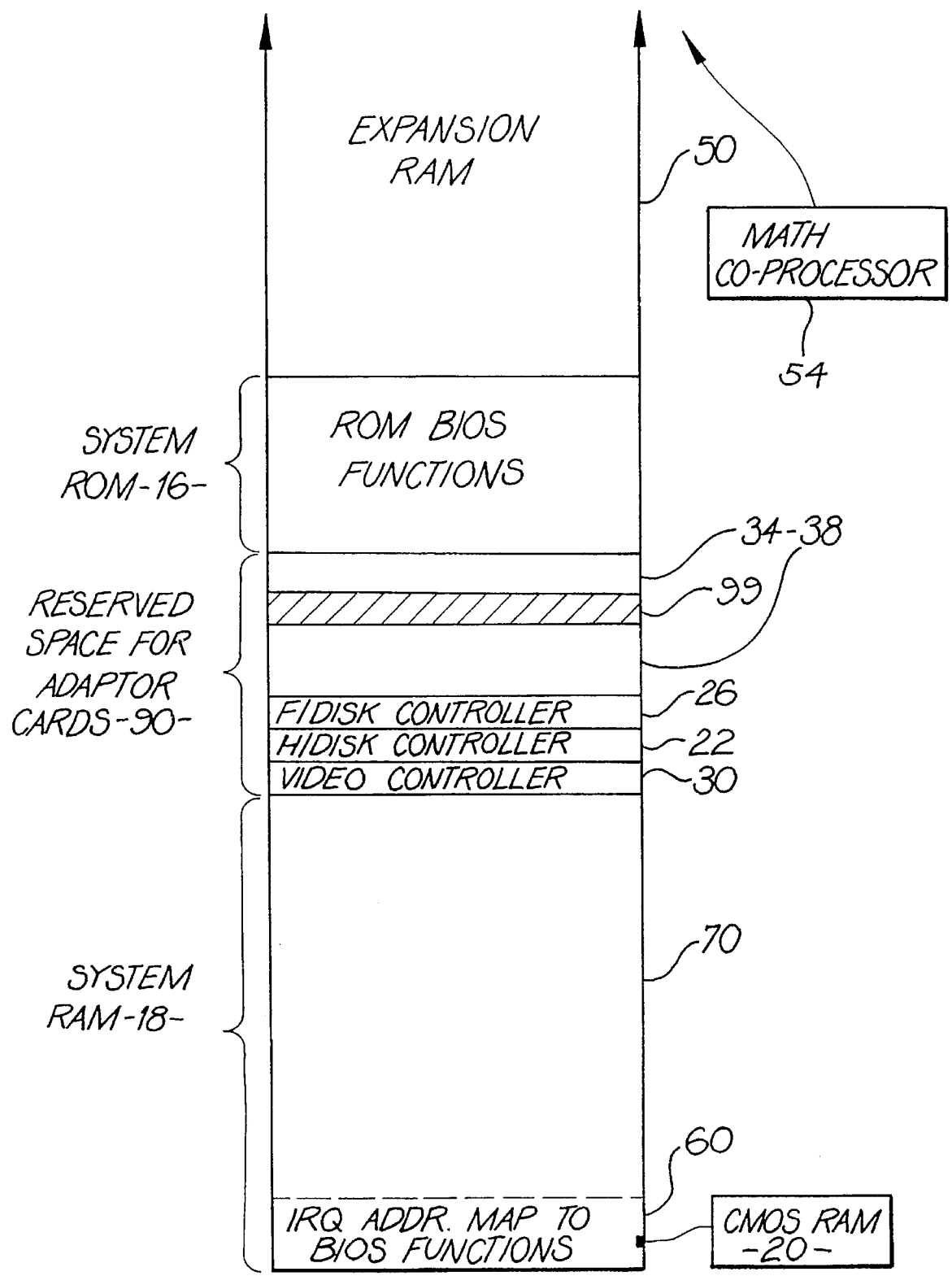
FIG. 2 illustrates the addressable memory locations of the system of FIG. 1.

Turning now to FIG. 2, a map of addressable location within the computer system 10 is shown. The addressable memory locations are divided amongst the system RAM 18, a space 90 for the adaptor cards 52, 56, the system ROM 16, the major hardware units 20, 34, 38, 46, 30, 26, 22, and the expansion RAM 50.

The system ROM 16 occupies a substantial portion of the memory locations. The ROM 16 comprises a Basic Instruction for Operating System (BIOS) function which includes those fundamental instructions which operate the computer system 10 at power-up. The BIOS initializes specific hardware devices such as peripheral interface adaptors, communication ports and disk drives prior to normal operation. In addition, the BIOS establishes an interrupt (IRQ) address map 60 in the RAM 18, seen at the bottom of FIG. 2. The IRQ address may 60 comprises pointers which, on receipt of an interrupt request by the main processor 12, pass control to that area of the ROM 16 vectored by the addressing the IRQ address map 60. Because the IRQ address map 60 is formed within free memory of the RAM 18, such memory is vulnerable to augmentation or deletion, possibly through the action of a virus.

Once the BIOS function has set up the standard components of the computer system, the BIOS function then looks into the reserved card space 90 and logs in those adaptor cards present within the space by executing internal procedural codes loaded onto each particular card.

Figure 3:
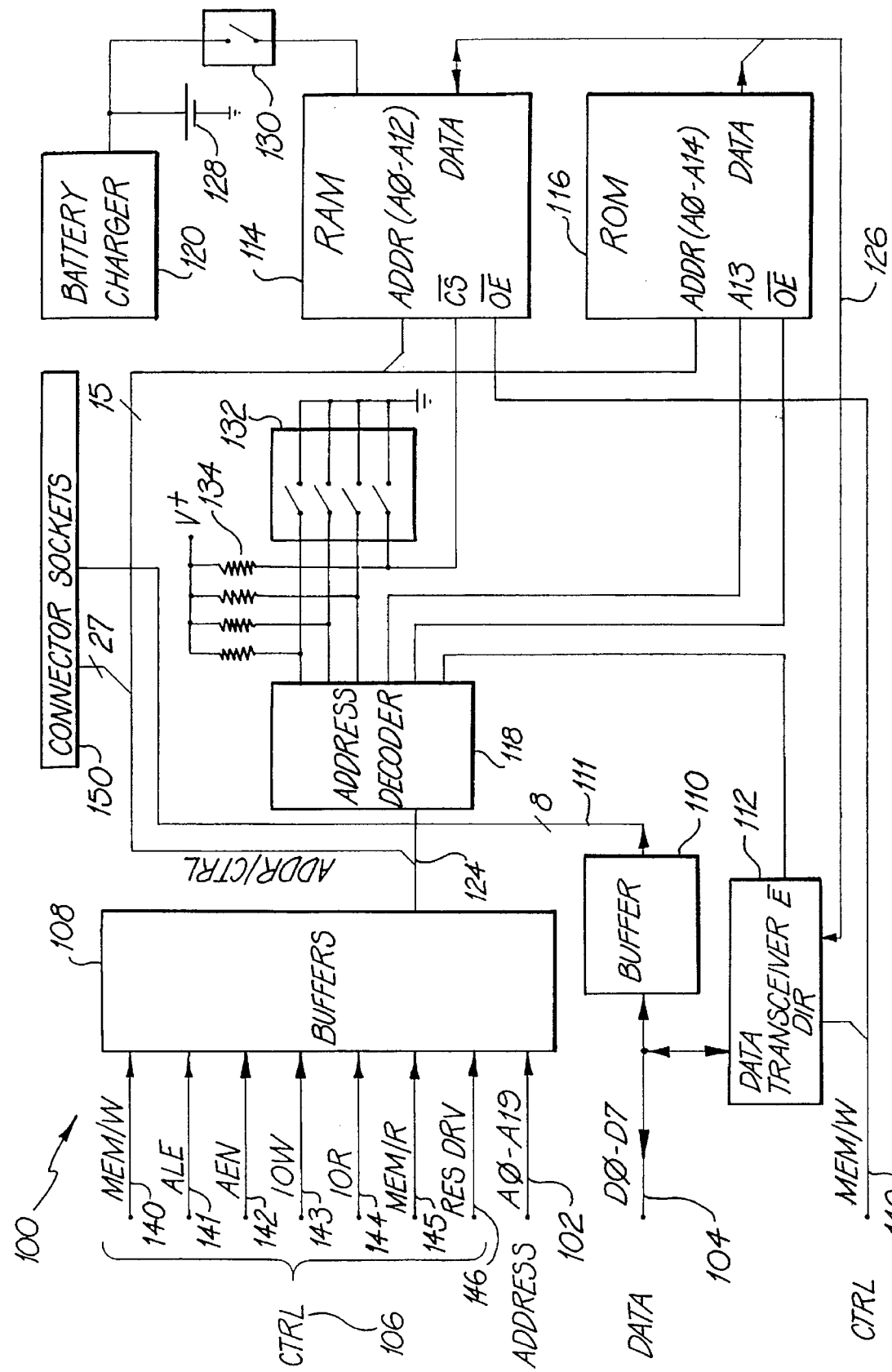
FIG. 3 is a block diagram representation of the virus protection device motherboard (VG-MB) seen in FIG. 1 of one embodiment.

Turning now to FIG. 3, the VG-MB 100 is shown and is specifically adapted for use with the IBM PC/AT series of personal computers. The VG-MB 100 includes a control bus input 106, an address bus input 102, and a data bus input 104. The control bus 106 includes standard IBM PC/AT control lines such as memory write (MEM/W) 140, address line enable (ALE) 141, address enable (AEN) 142, input-output write (IOW) 143, input-output read (IOR) 144, memory write (MEM/R) 145, and reset drive (RES_DRV) 146. The control bus 106 and address bus 102 connect to a number of buffers 108 which prevent loading of the buses 102, 106. The data bus 104 also connects to a buffer 110. The buffers 108, 110 can be configured using 74LS244 devices or other similar devices.

The VG-MB 100 includes an address decoder 118 which connects to an internal address/control bus 124. The address decoder 118 provides memory address selection for a RAM 114 and an ROM 116. The RAM 114 and ROM 116 also connect to the internal address/control bus 124 as indicated. The RAM 114 can for example be a 6264 device and the ROM 116 a 27256 device for example.

The VG-MB 100 also includes a battery charger 120 and a battery 128 which provide battery backup to the RAM 114 and data stored therein. This provides further protection in the event of a virus caused power down. A switch 130 allows the battery 128 to be selectively connected.

The address decoder 118 is used to decode addresses on the address bus 102 to make appropriate data selections within the RAM 114 and ROM 116. To permit various functions to be user selectable, a bank 132 of four switches is arranged together with pull-up resistors 134 to provide various selection inputs to the address decoder 118. The address decoder 118 can be configured in a known manner using discrete components, or alternatively, using a programmable logic array.

An 8 bit data transceiver 112 is provided which interfaces the data bus 104 to each of the RAM 114 and ROM 116 via an internal data bus 126. The internal address/control bus 124, and a data bus 11 from the buffer 110 also supply the connector socket 150 thus permitting connection to, and operation of the VG-DB 200, as will be described later.

The ROM 116 comprises a program which implements specific functions of the VG-MB 100. A summary of that function is as follows. When the BIOS function is setting up the reserved card space as earlier described, the BIOS function allows the VG-MB 100 to execute its own internal codes, resident in the ROM 116, so as to initialize itself. During initialization, the VG-MB 100 copies the IRQ pointer values out of the IRQ address map 60 and stores them within the RAM 114. It then alters the IRQ pointers in the IRQ address map 60 of FIG. 2 to point to dummy memory locations also within the RAM 114. This enables the VG-MB 100 to filter specific interrupt requests prior to those requests being executed by standard functions of the ROM 16 provided in the computer system 10.

Figure 34A:
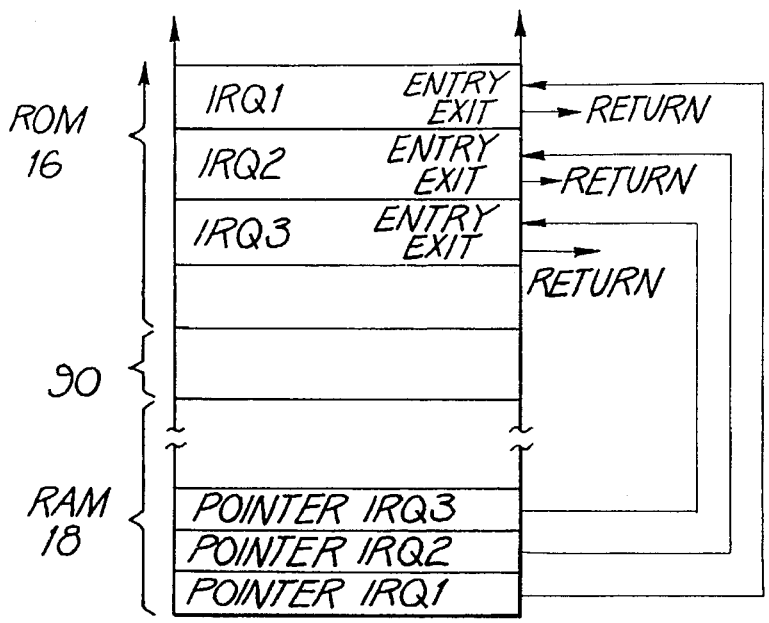
FIGS. 34A and 34B show the reconfiguration of the interrupt vectors.
Figure 34B:
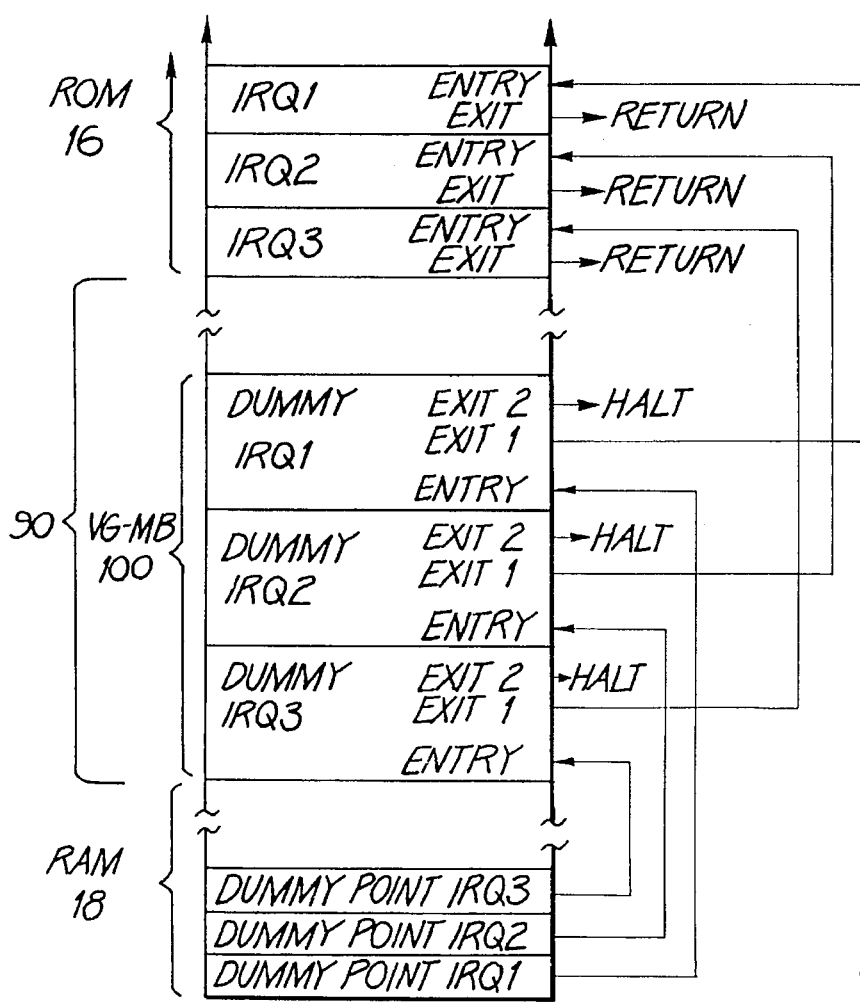

The reconfiguration of the interrupt vectors is illustrated in FIGS. 34A and 34B, the former showing a standard BIOS configuration and the latter showing the configuration after initialization of the VG-MB 100.

In a specific application for the IBM PC/AT, IRQB, IRQ13 and IRQ2F are examples of specific vectors that are re-pointed into the RAM 114. The VG-MB 100 can thereby monitor interrupt requests as they pass into the dummy locations within the RAM 114. If the interrupt requests are ones that would cause either deletion or changes to memory, either within the RAM 18 space of FIG. 1 or at any other addressable memory location, the control program within the ROM 116 halts all further execution of the interrupt and then indicates to the operator of the computer system 10 that changes to data stored in memory, are envisaged. If the operator was not implementing a data change function, as might be occurring when reading from, or writing to disk, the evidence of a data change operation identified by the VG-MB 100 can indicate the presence of a computer virus taking action unknown to the operator. If such is the case, the operator can cease all further operation of the computer system 10 so as to prevent loss of data. If, however, a data operation was being executed, this will be apparent to the operator who can then choose to continue with the operation, whereby the VG-MB 100 re-points the dummy vectors within the RAM 114 to the actual locations in the ROM 16 of the computer system indicated in FIG. 2. Execution of the instruction thereby continues.

The foregoing method is effective for preventing damage caused by computer viruses in that it monitors data operations controlled by the main processor 12 and only allows data changes to occur with the full knowledge of the computer operator.

Figure 8:
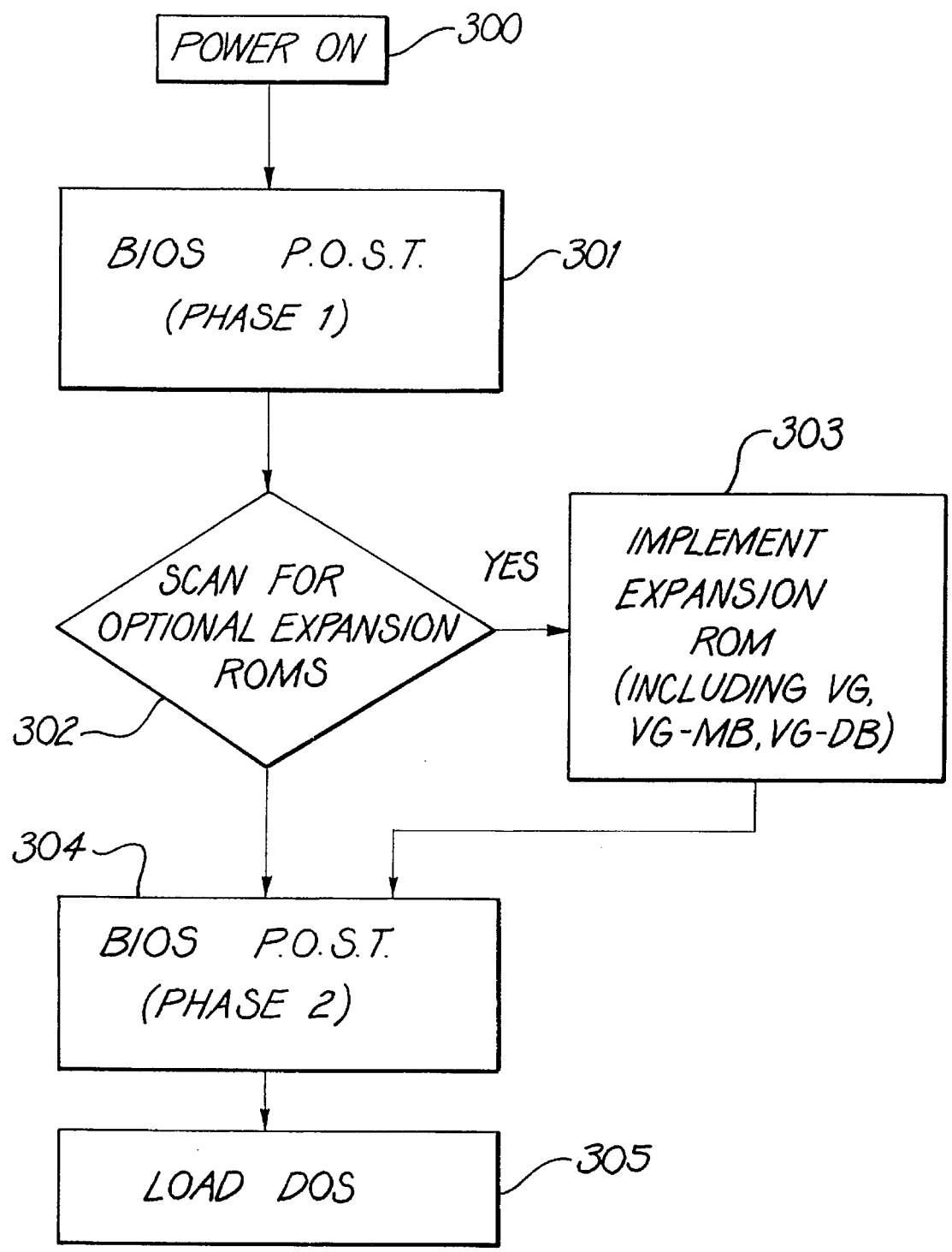
FIG. 8 is a flowchart of the BIOS Initialization Procedure.
Figure 9A:
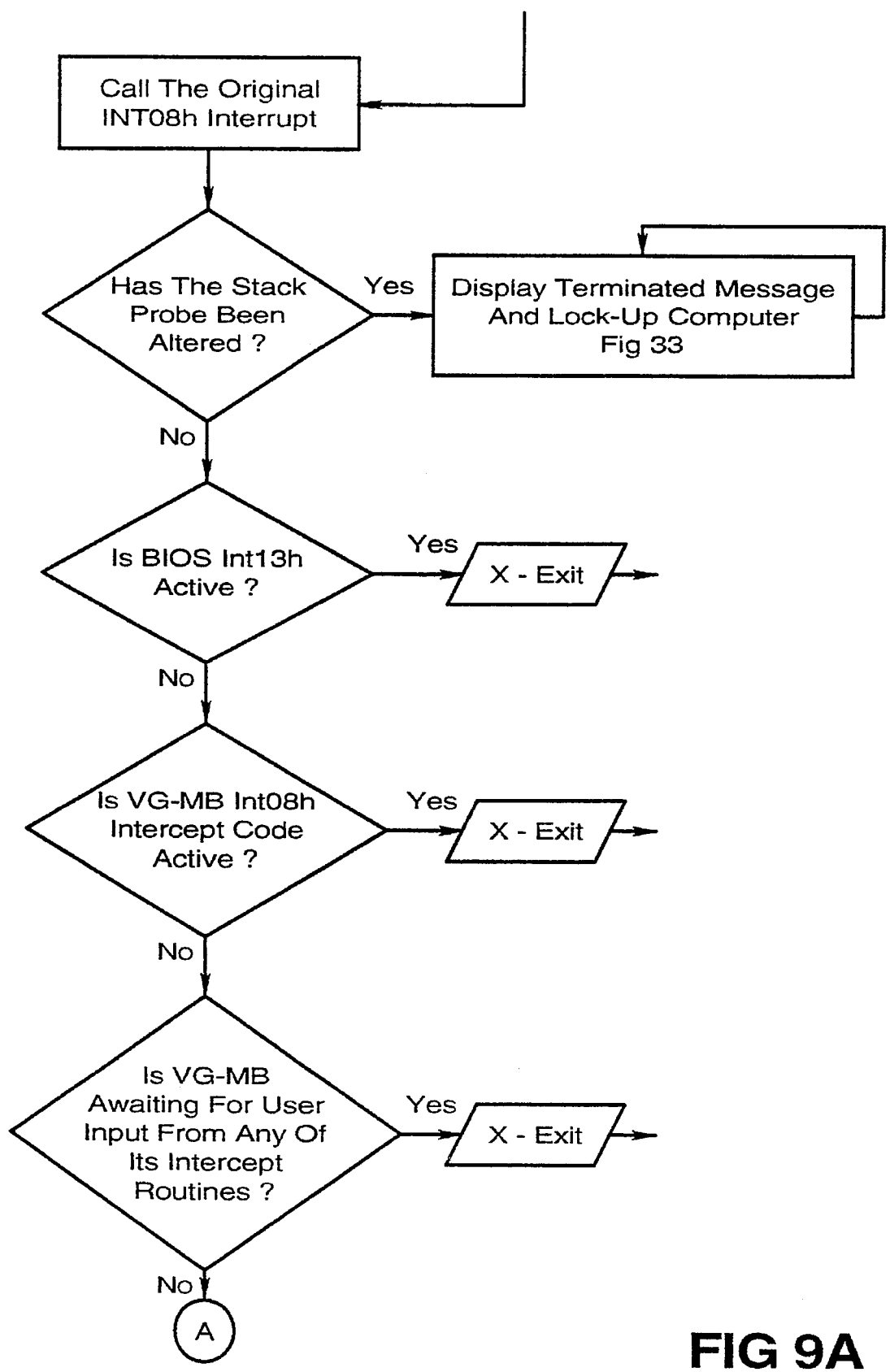
FIG. 9A to 9F show a single flowchart for a particular BIOS "08" Intercept.
Figure 9B:
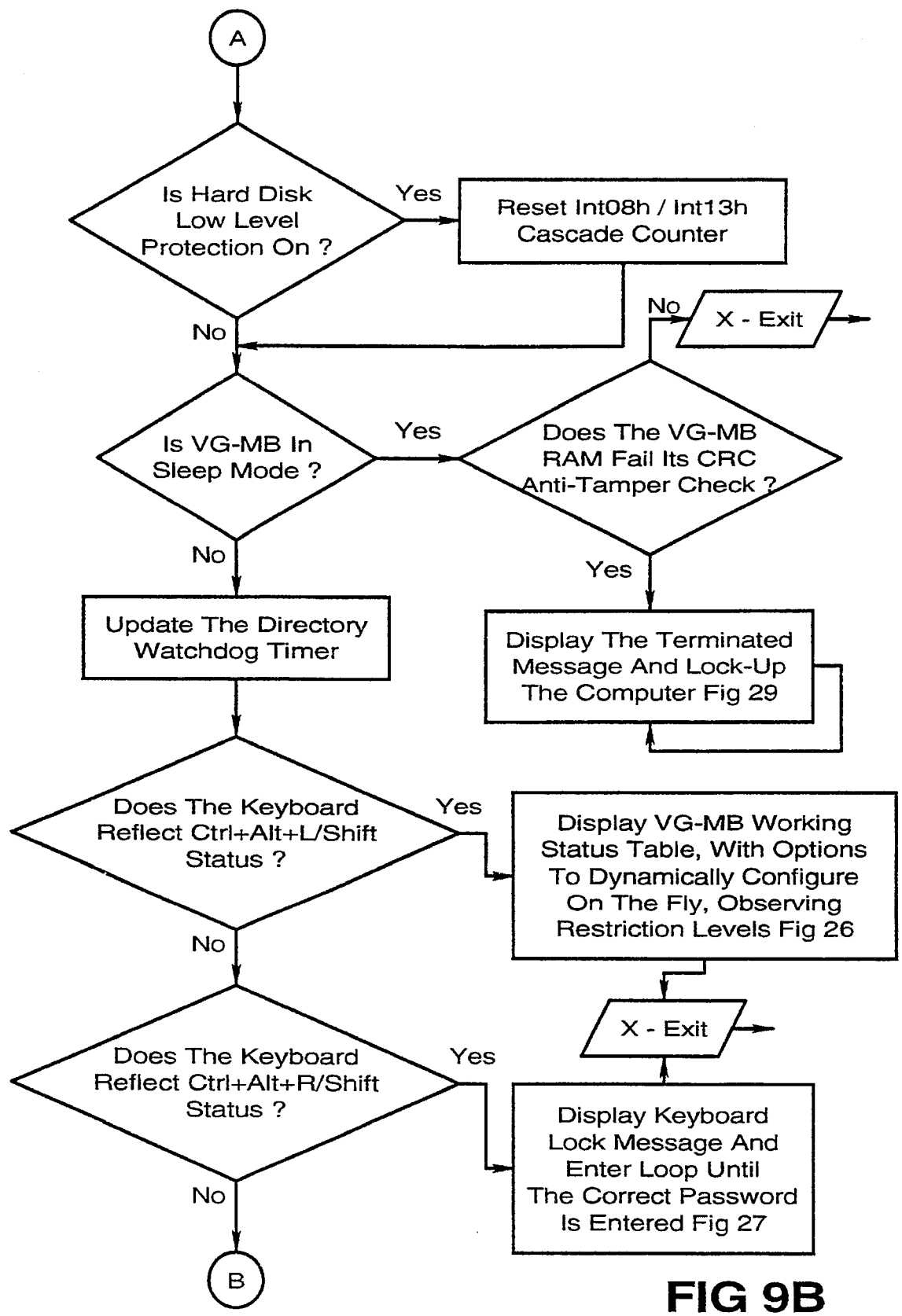
Figure 9C:
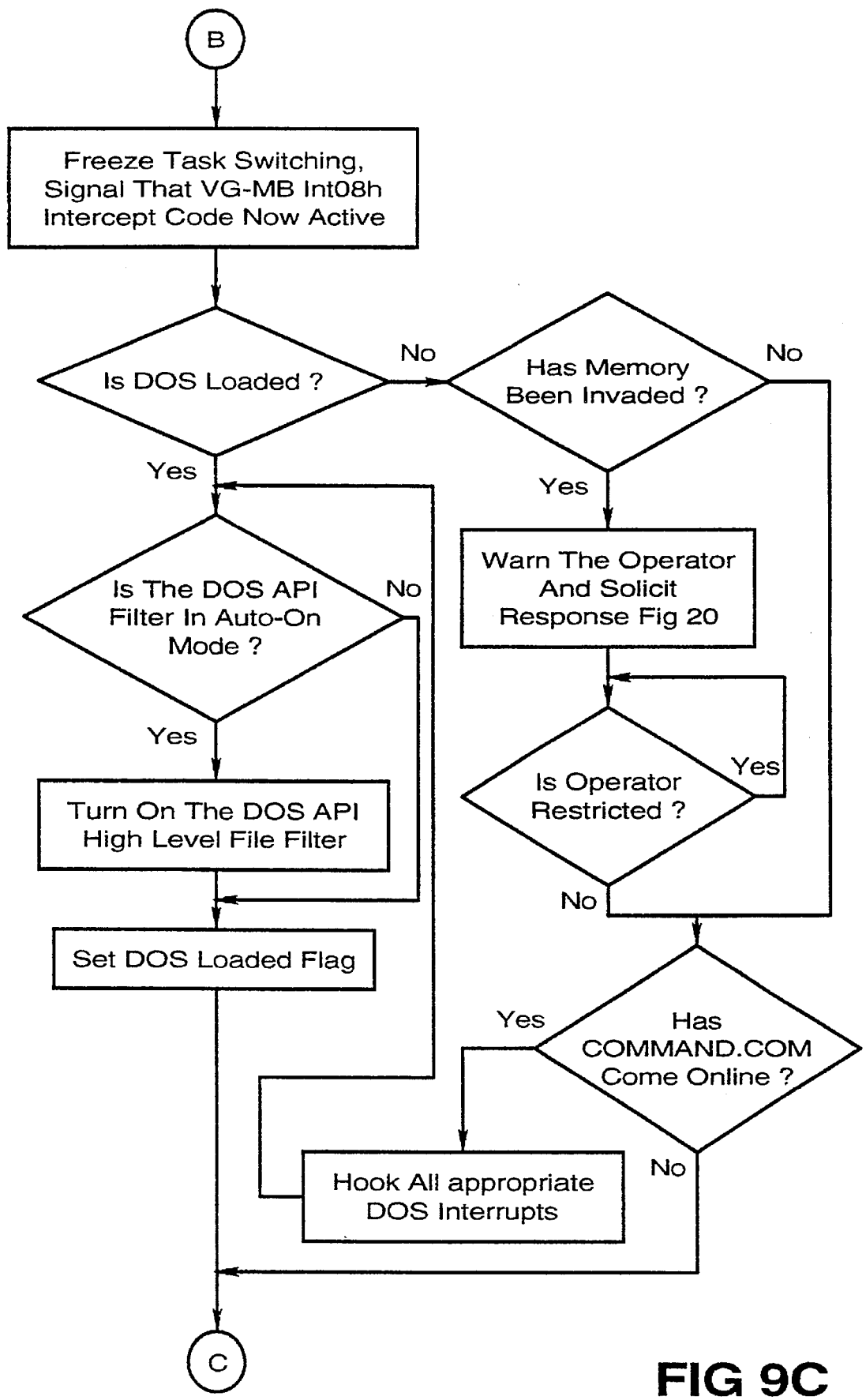
Figure 9D:
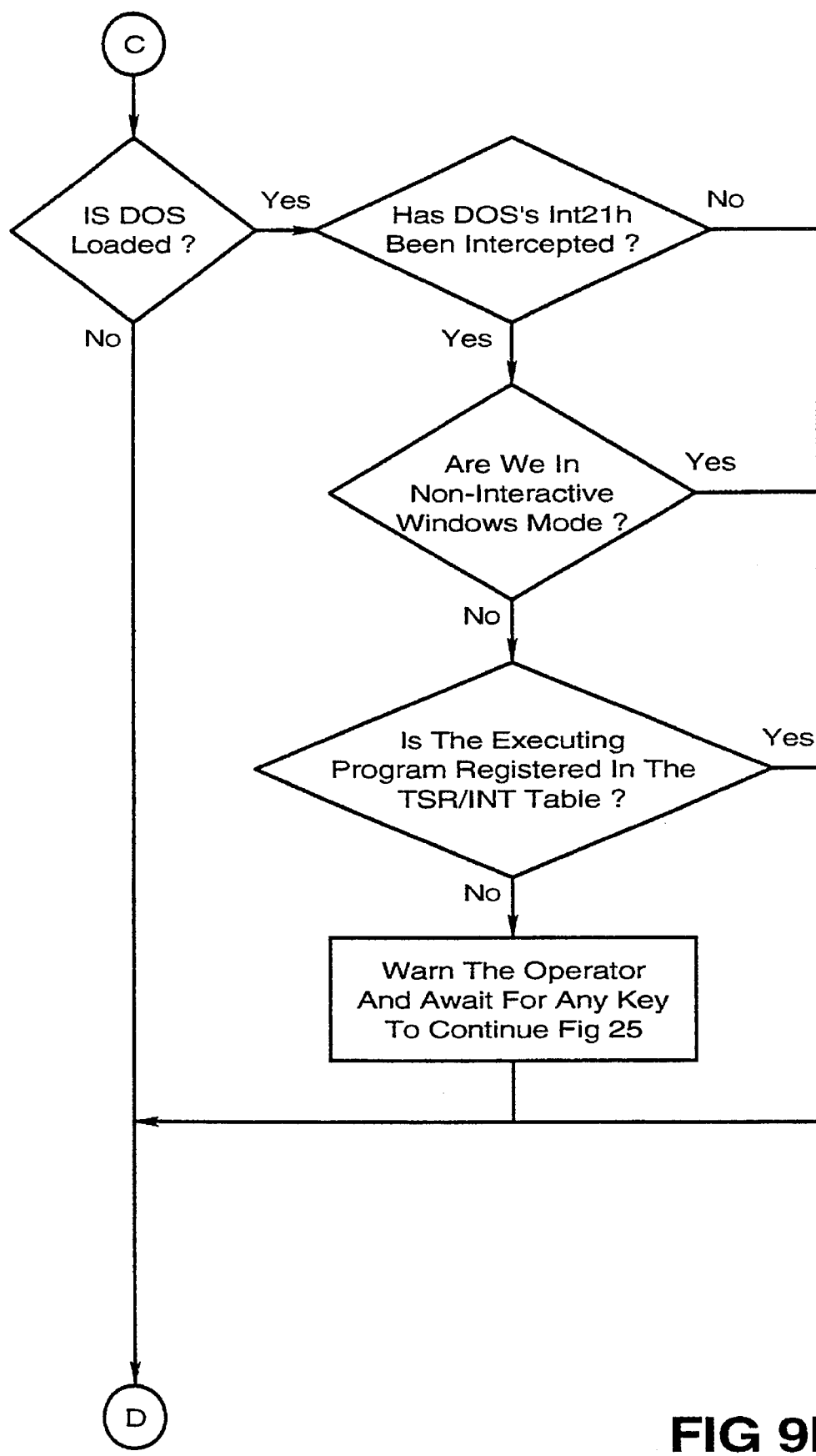
Figure 9E:
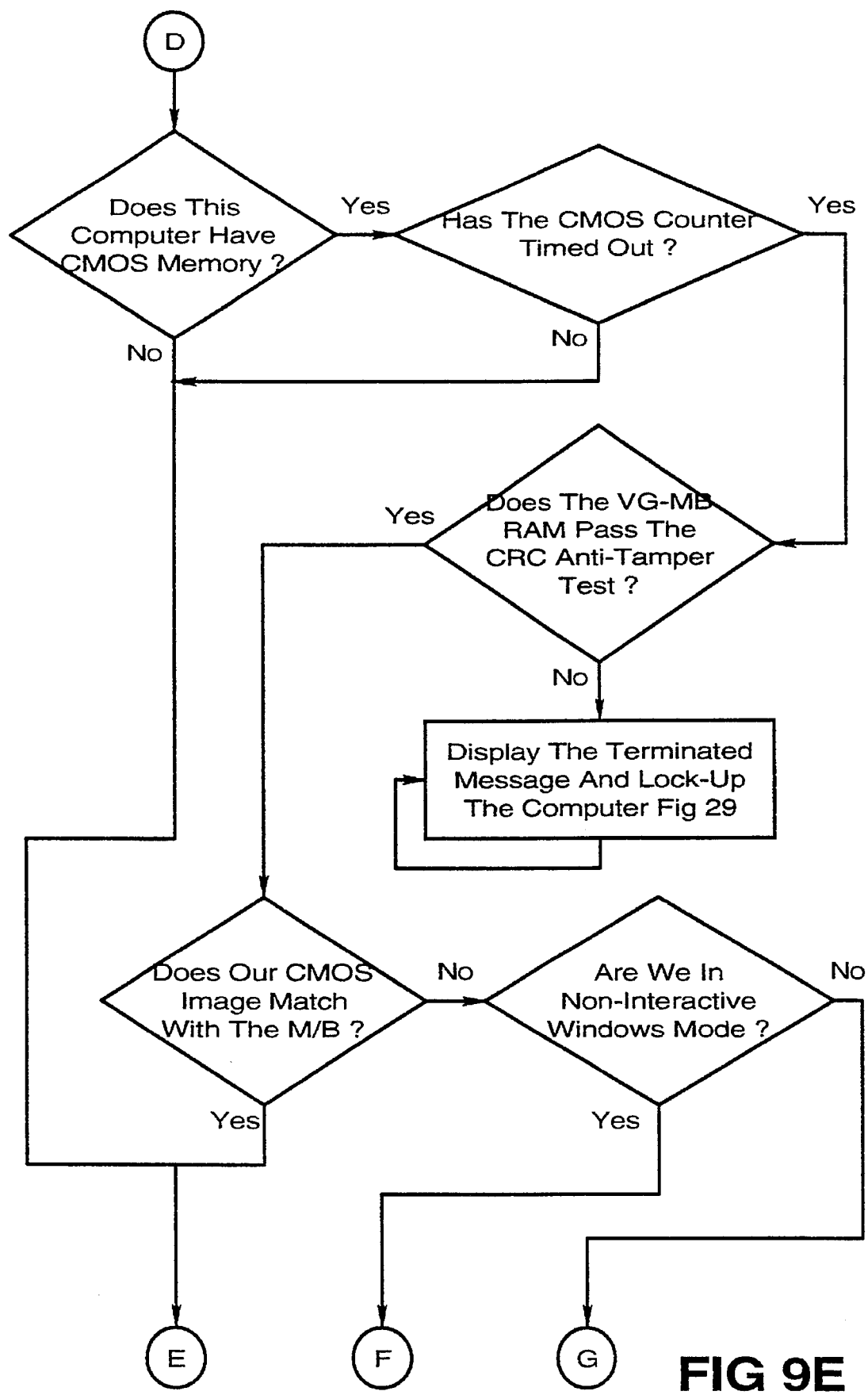
Figure 9F:
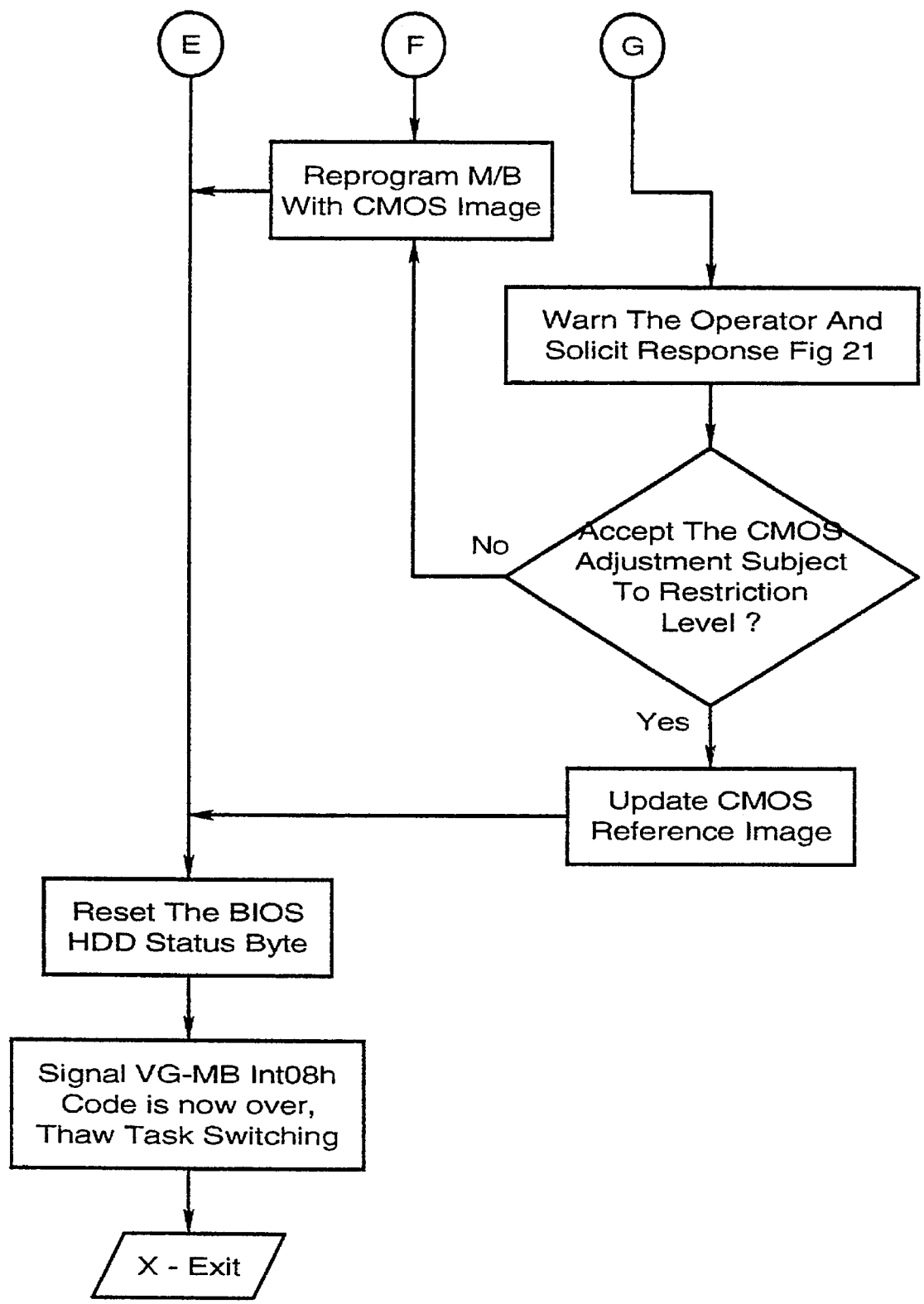

FIG. 8 shows the BIOS initialization procedure which includes the initialization of the VG-MB 100 as earlier described.

The BIOS initialization procedure commences with a Power On stage 300 followed by phase 1 of the BIOS Power On Self-Test (POST) 301. In this step, BIOS initialises the keyboard interface adaptor 34, a test processor (not illustrated) performs a BIOS CRC ROM check, initialises the DMA control (SCSI) 46, tests 16 KBytes of base memory within the RAM 18, initialises an interrupt controller (not illustrated), reads configuration data, initialises the video controller 30, tests the CRT 32, tests the interrupt controller, initialises the real-time clock 20, tests the clock 20, tests the keyboard 36, builds the BIOS vector table illustrated in FIG. 34A, and tests the remaining memory.

After step 301, step 302 scans the reserved memory addresses 90 for optional expansion ROM's included in any adaptor PCBs. If expansion ROM's are found, such as in the VG-MB 100, control passes to step 303.

In step 303, the ROM CRC is tested and if valid, control is passed to the expansion ROM of the particular adaptor board. When the VG-MB 100 receives control the following services are monitored:

all floppy diskette services to the floppy disk drive 28;

all hard disk services to the hard disk drive 24; and all timer services to the real-time clock 20.

In addition, the VG-MB 100 places probes for keyboard status, memory status and the pending load of the Disk Operating System (DOS). At this stage, all of the VG-MB 100 low level services are fully functional. If the VG-DB 200 is fitted, appropriate memory probes are placed for non-BIOS HDC/FDC access and selected DMA, placing the VG-DB 200 in full working order. After initialisation, the VG-MB 100 returns control back to BIOS.

After completion of step 303, step 304 is implemented which is phase 2 of the BIOS POST. This tests the floppy disk controller 26 and determines if a floppy disk drive 28 is attached. It also initialises RS232 ports such as would be used in concert with the UART 42 as well as initialising LPT ports for example with the interface adaptors 34 and 38. Phase 2 also builds an equipment list, enables interrupts, and then trys to load boot loader code from the floppy disk drive 28. If the floppy disk drive 28 fails to respond, then phase 2 tests the hard disk drive controller 22 for a hard disk drive 24 and attempts to load the boot loader code from the hard disk drive 24.

At the completion of phase 2, DOS is loaded in step 305. In this step, DOS is loaded in four phases. Phase 1 represents a standard device driver interface, phase 2 represents an application program interface. After phase 2, the VG-MB 100 is aware of DOS and monitors selected API services. This implements high level protection facilities of the VG-MB 100. Phase 3 follows which is a user supplied device drive enhancements and phase 4 completes step 305 with command console processor functions.

The VG-MB 100 also takes a photograph copy of the BIOS memory table which resides in the top portion of the ROM 16 seen in FIG. 2. This provides the VG-MB 100 with the ability to check the vector table. If a match is achieved, the interrupt processing is allowed to continue. If the photograph does not match the table, further processing is halted as this indicates a corruption of data within the VG-MB 100, which can indicate viral damage.

FIGS. 9 to 33 illustrate a number of operations of the VG-MB 100 which monitors operations controlled by the main processor 12. FIGS. 9 to 17 show flow diagrams for the processing of various interrupt vectors by the VG-MB 100. Where applicable, certain step indicate the corresponding FIG. number of a warning message (FIGS. 18–33) that is displayed at that particular time. Also, where a user selection is indicated, "X" means to exit or quit, and "E" means to execute, that particular function. Also, references to the API filter are to be construed as references to the VG-MB 100.

FIGS. 18–33 show various warning displays 16 of which can be output from the VG-MB 100 for display on the CRT 32 of the computer system 10. Also, an audio output can be sounded if desired. Each warning identifies a particular operation about to take place and requests appropriate action from the computer operator. If the operator's intention is to change the data, e.g. by writing to a floppy disk 28, the operator can select to continue. If, on the other hand, whilst normal processing within the computer system 10 is taking place, a virus instructs an amendment to data stored on a floppy disk 28, an appropriate warning will be issued. The user than has the option to abort the particular function so as to prevent viral damage.

Turning now to FIG. 9, the processing of the system timer vector INT 08H intercept is shown. Firstly, the intercept checks whether the BIOS vector is set and then determines whether the disk operating system (DOS) is loaded and operating. The INT 08H intercept also re-vectors DOS interrupts so as to allow monitoring of DOS functions. This can be achieved in the manner shown in FIG. 16. Also as seen in FIG. 9, where the computer system 10 includes CMOS non-volatile memory 19, this can be also corrupted by viruses and a photo image of the CMOS memory 19 is also taken. This also allows for the prevention of damage to data stored in permanent RAM 19.

Figure 10:
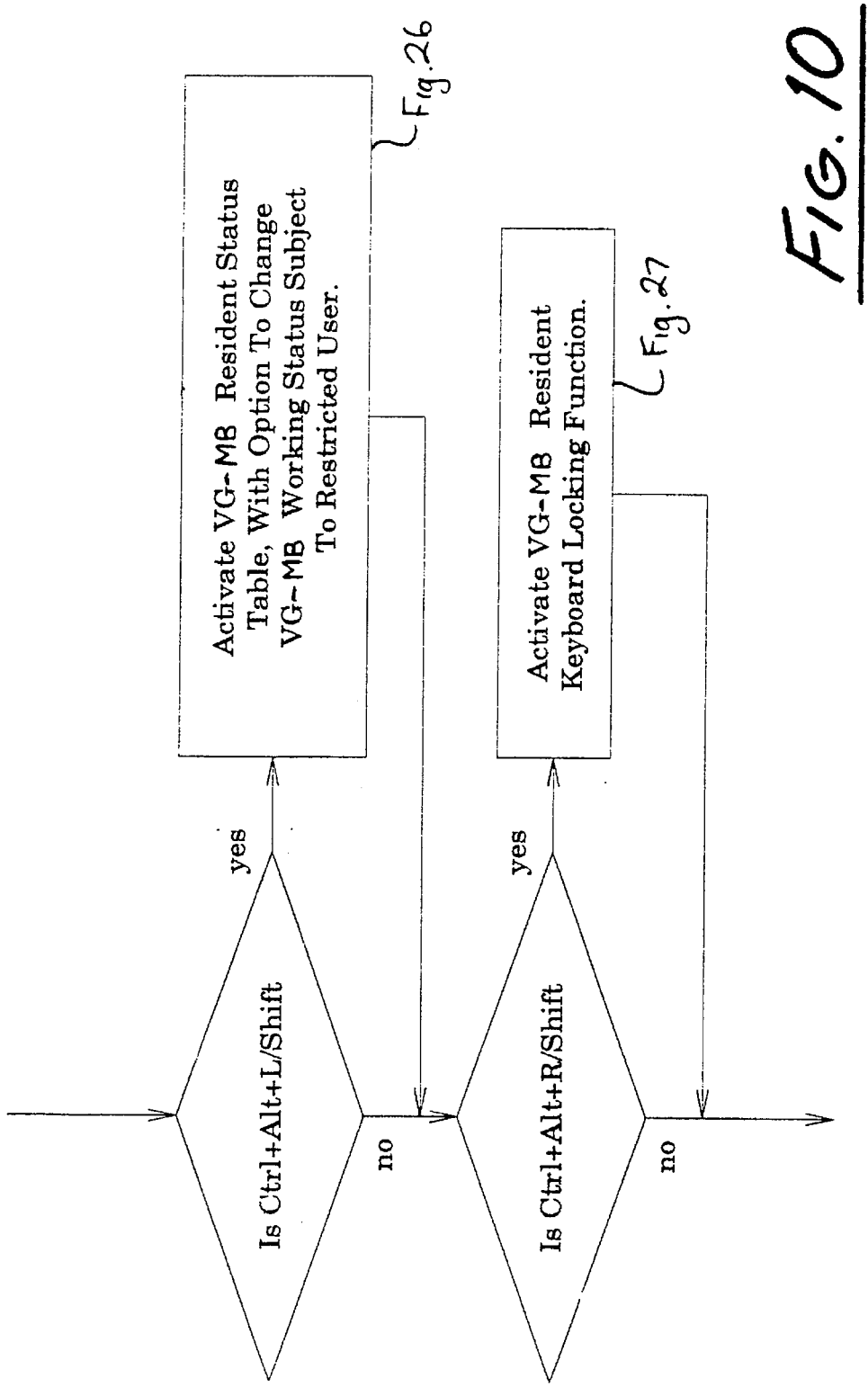
FIG. 10 shows a flowchart for a BIOS "09H" Intercept.
Figure 11A:
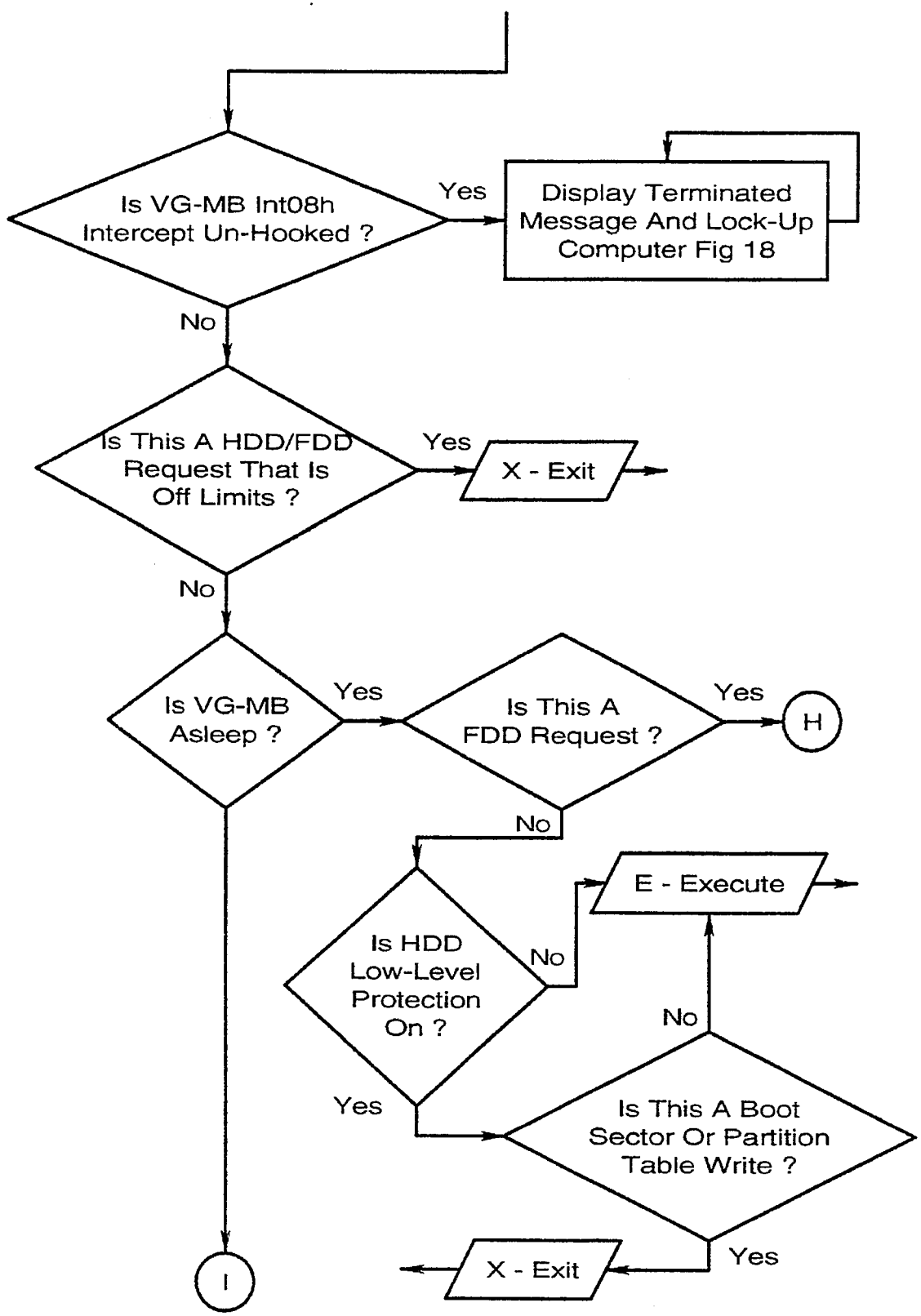
FIGS. 11A to 11D show a flowchart for a BIOS "13H" Intercept.
Figure 11B:
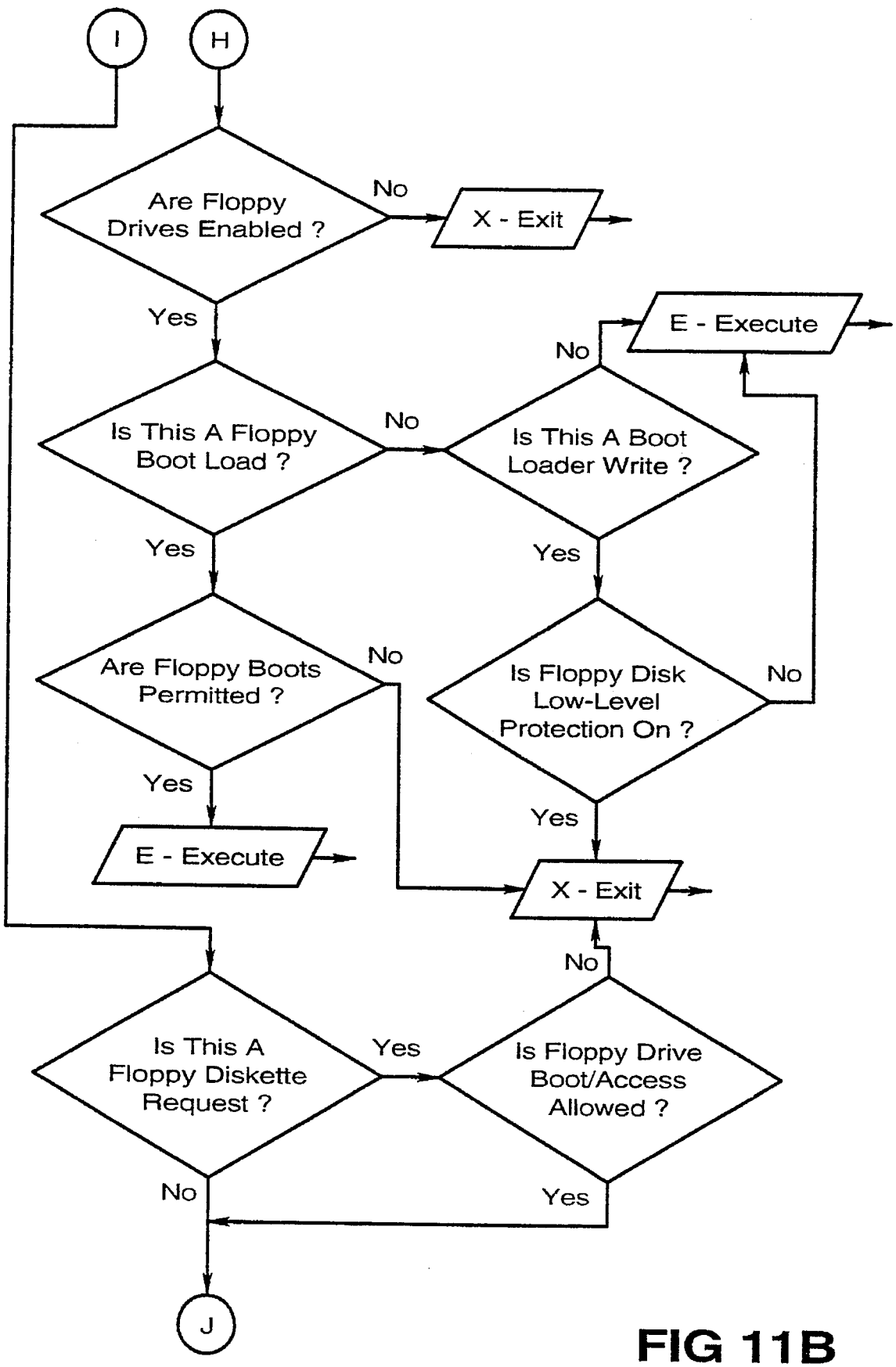
Figure 11C:
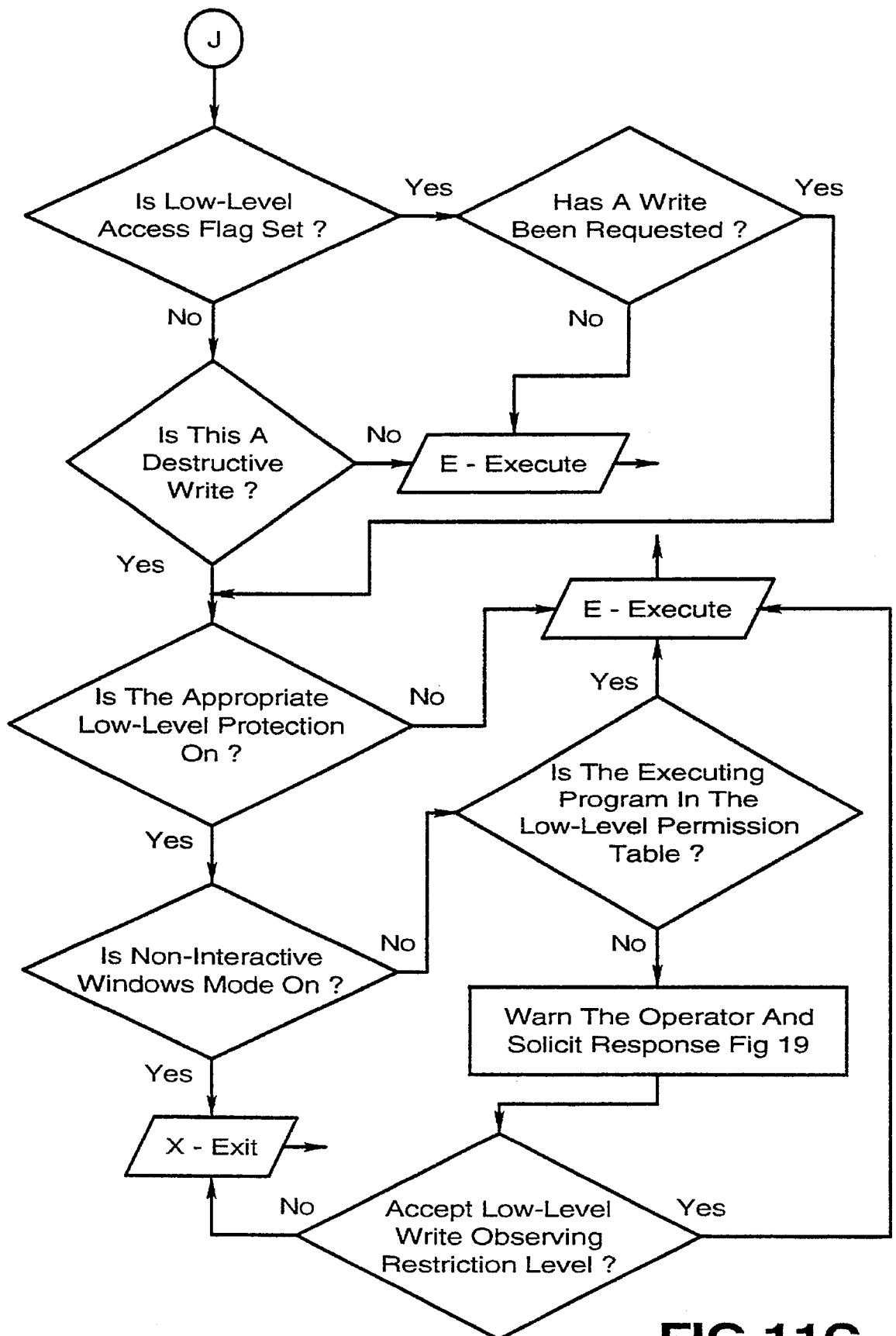
Figure 11D:
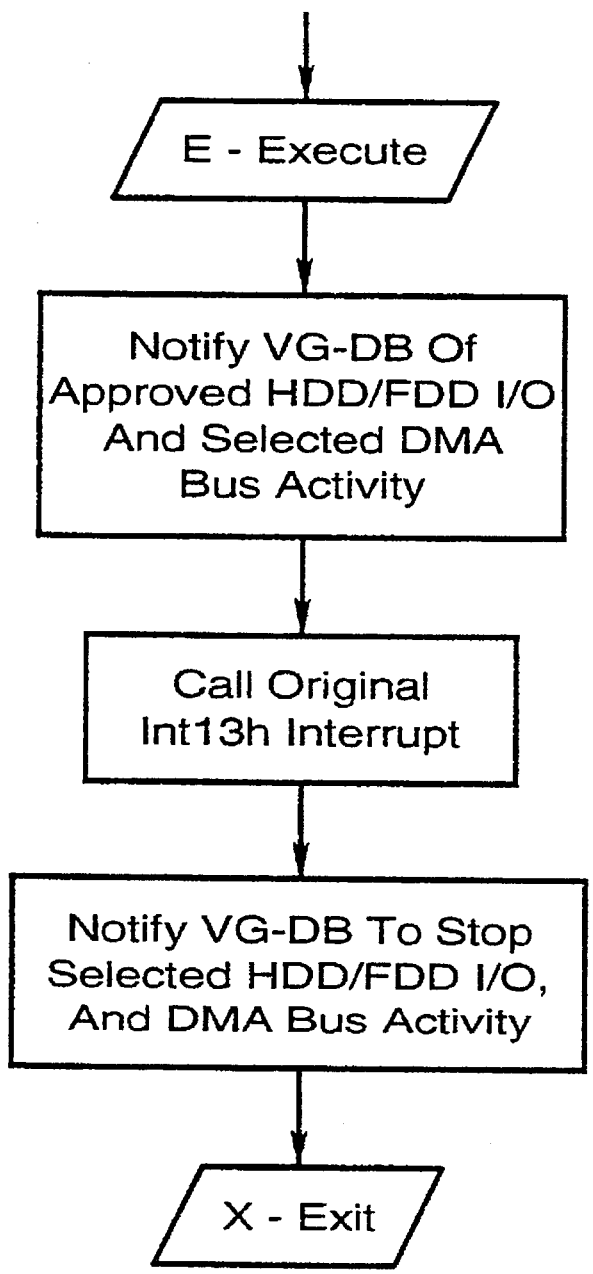
Figure 12:
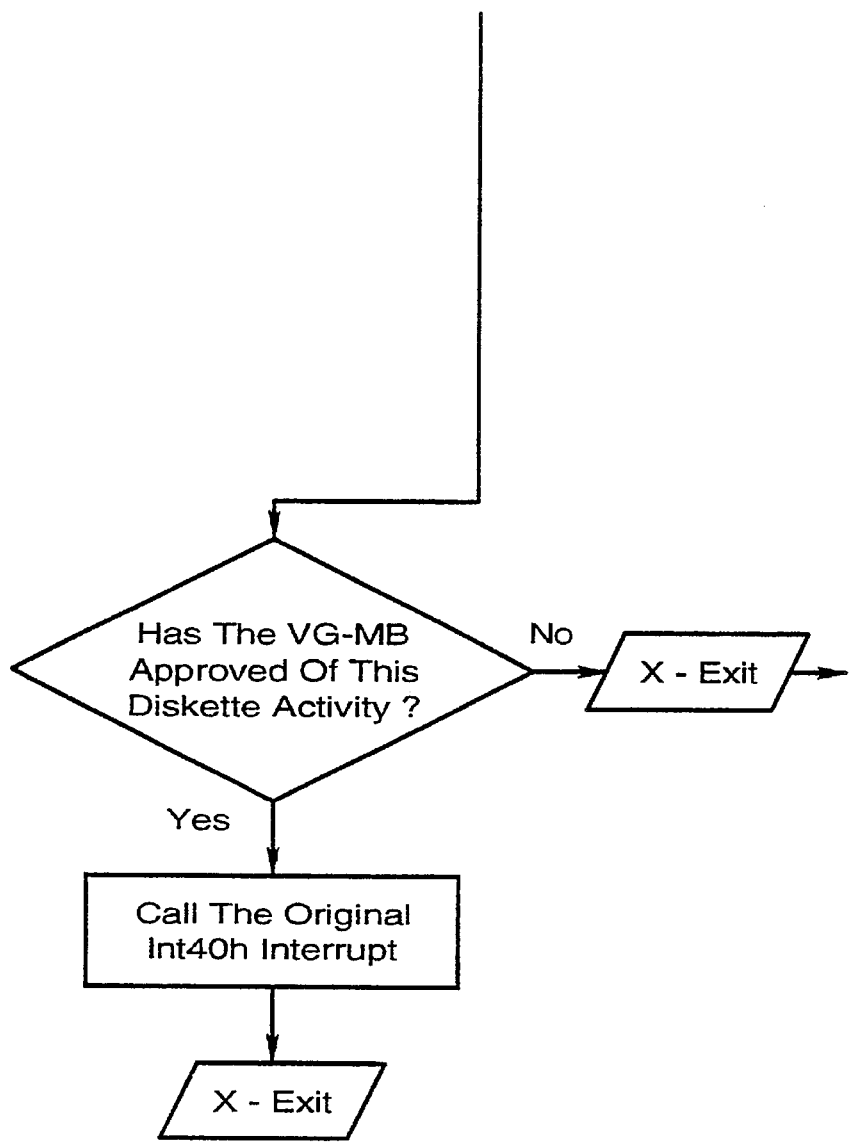
FIG. 12 is a flowchart for a BIOS "40H" Intercept.
Figure 13A:
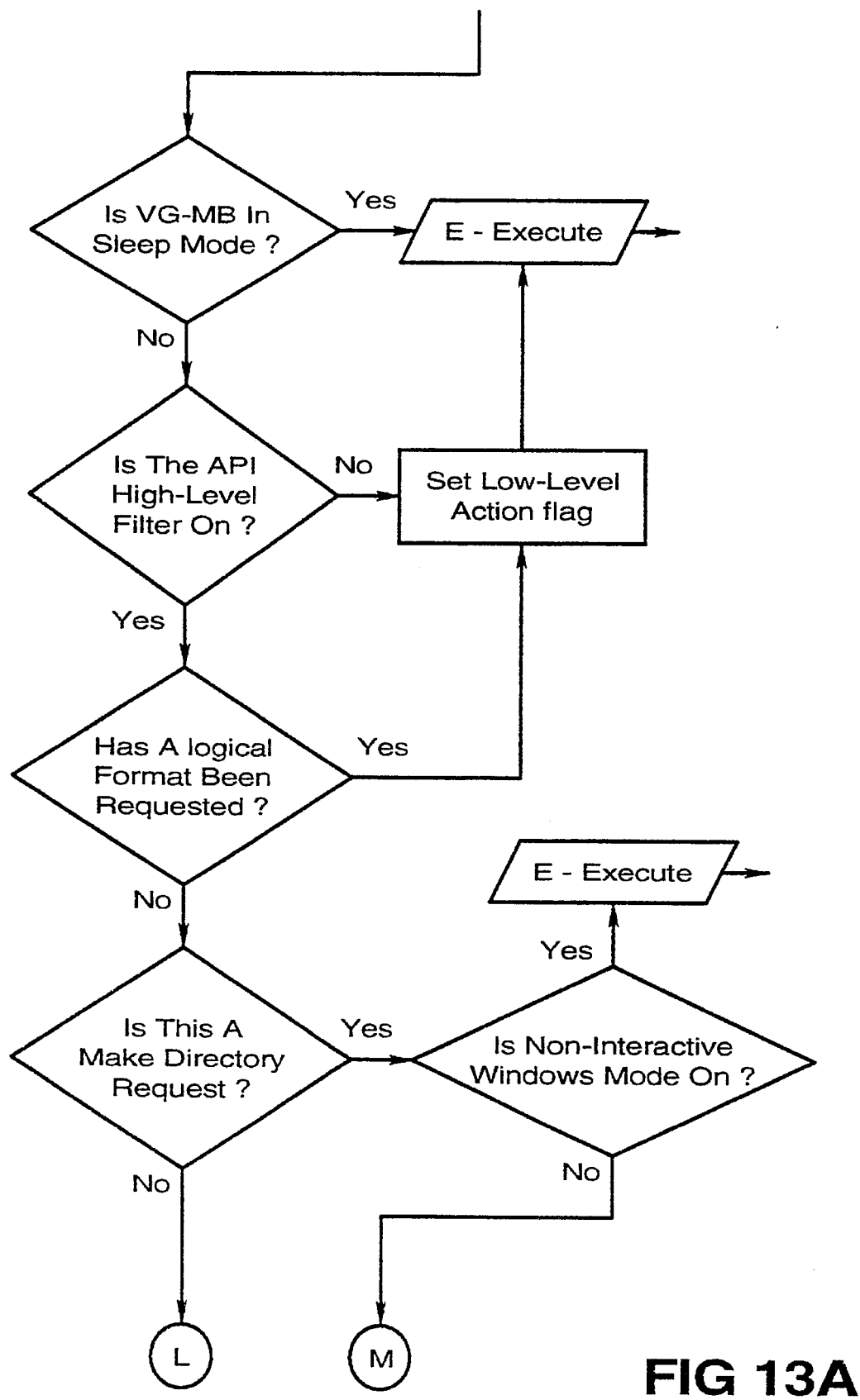
FIGS. 13A to 13E show a flowchart of a DOS "21H" Intercept.
Figure 13B:
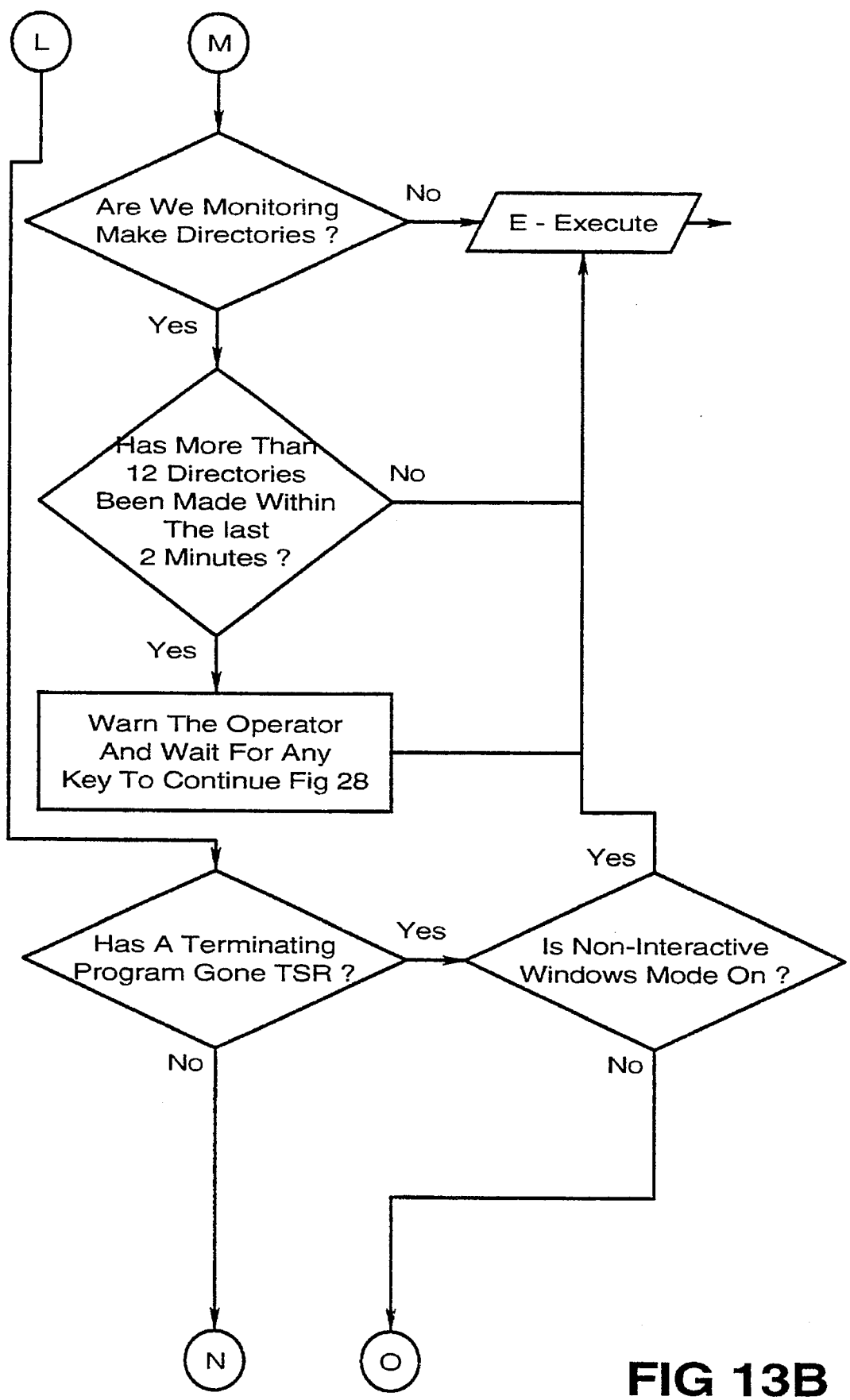
Figure 13C:
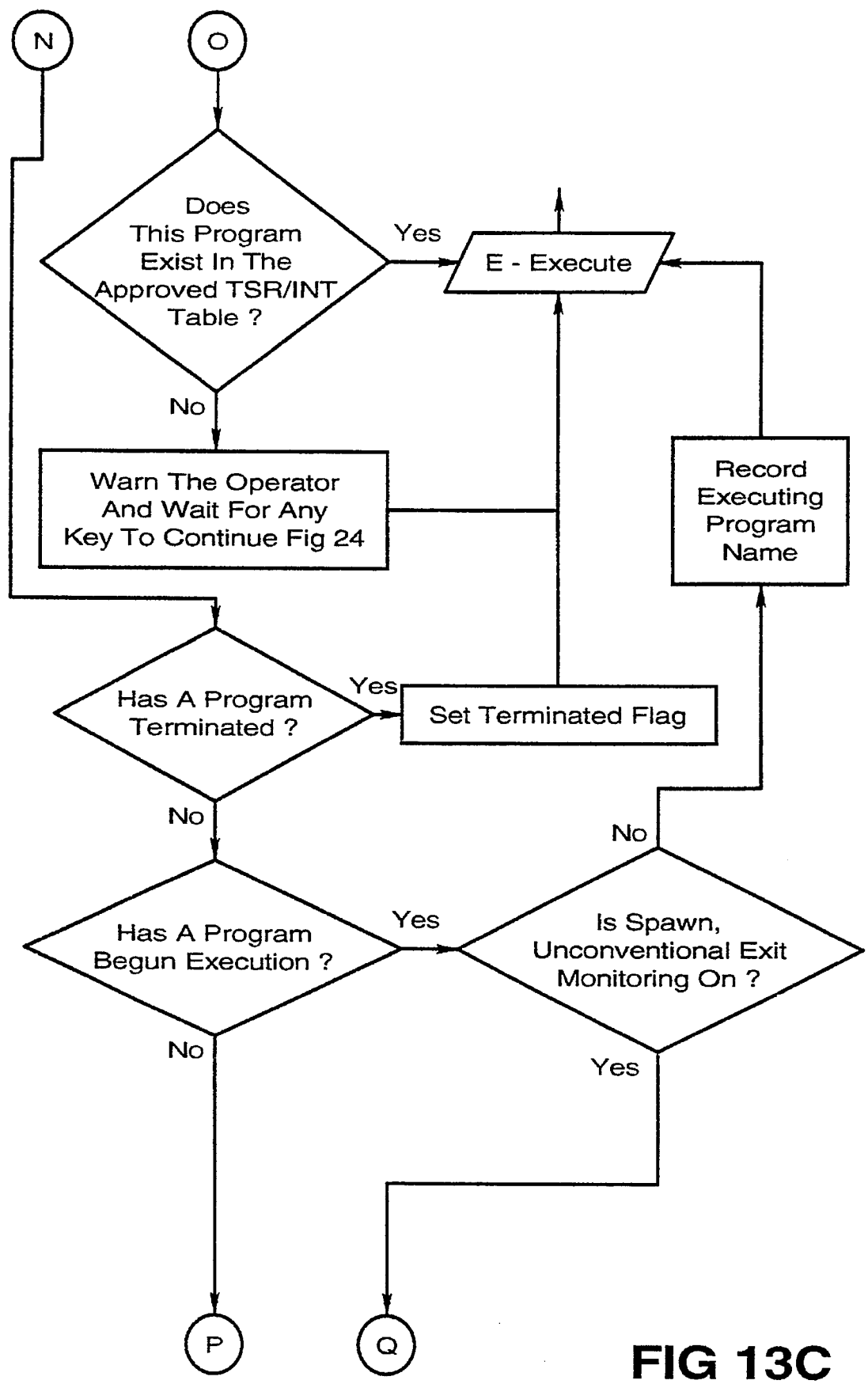
Figure 13D:
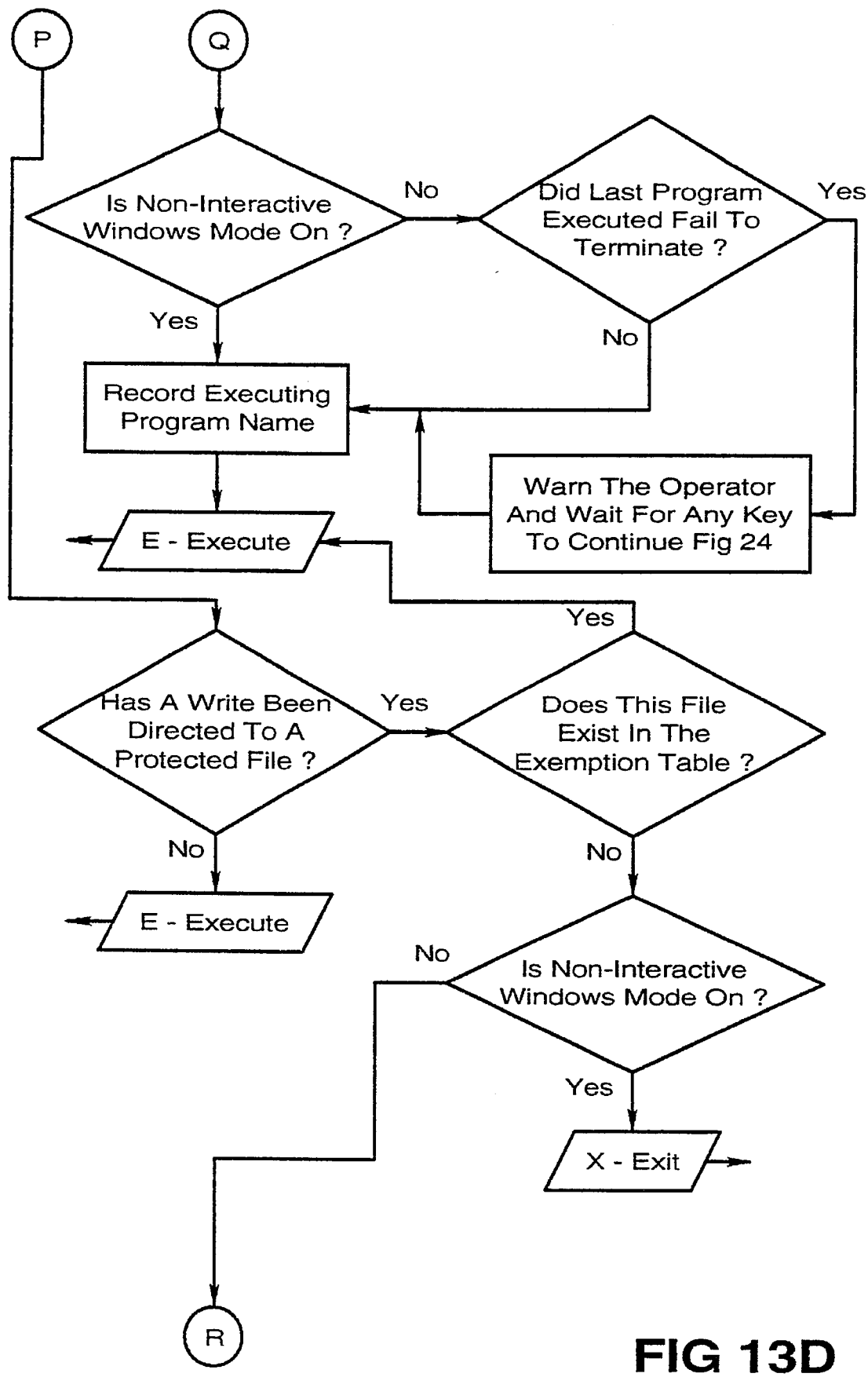
Figure 13E:
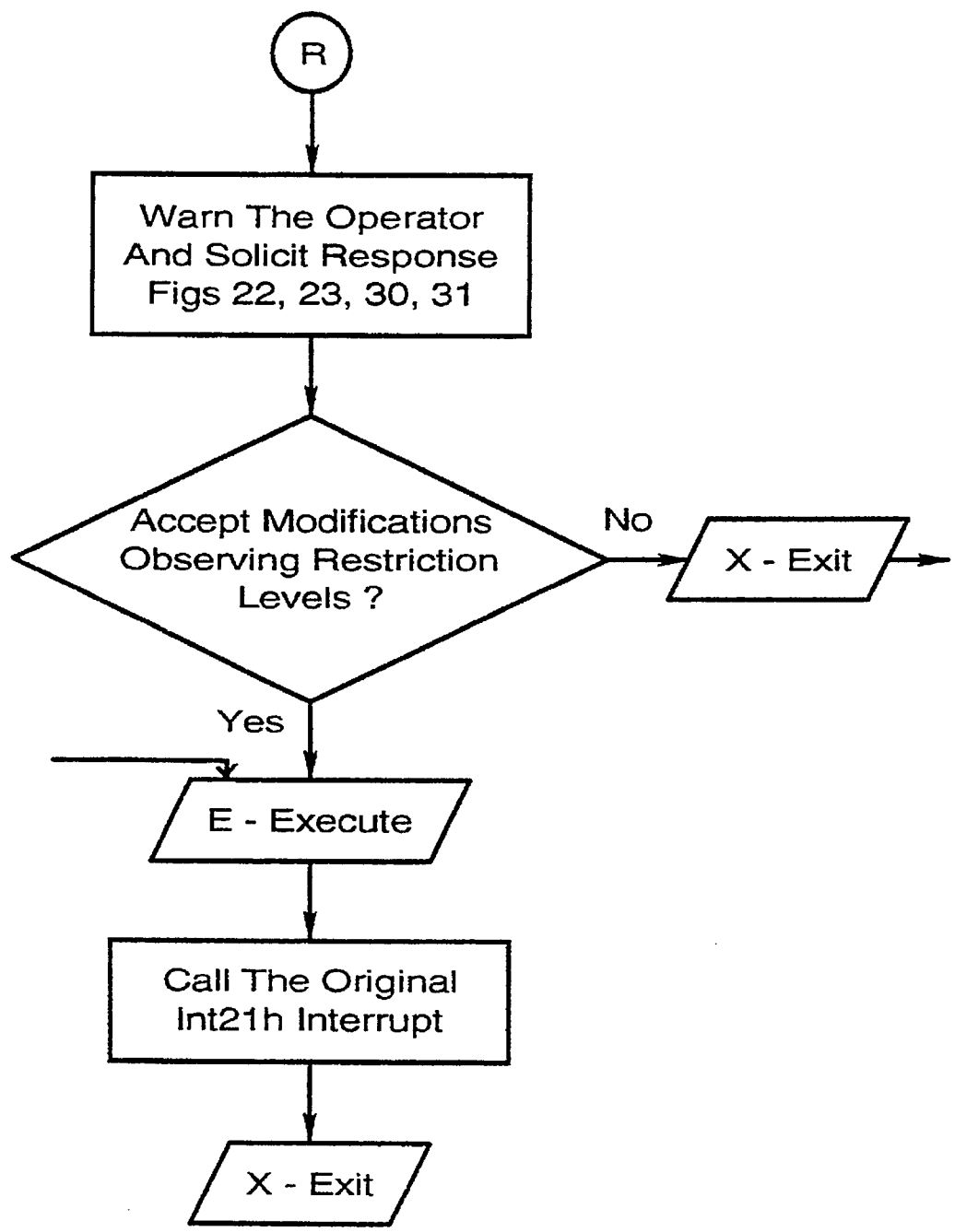
Figure 14:
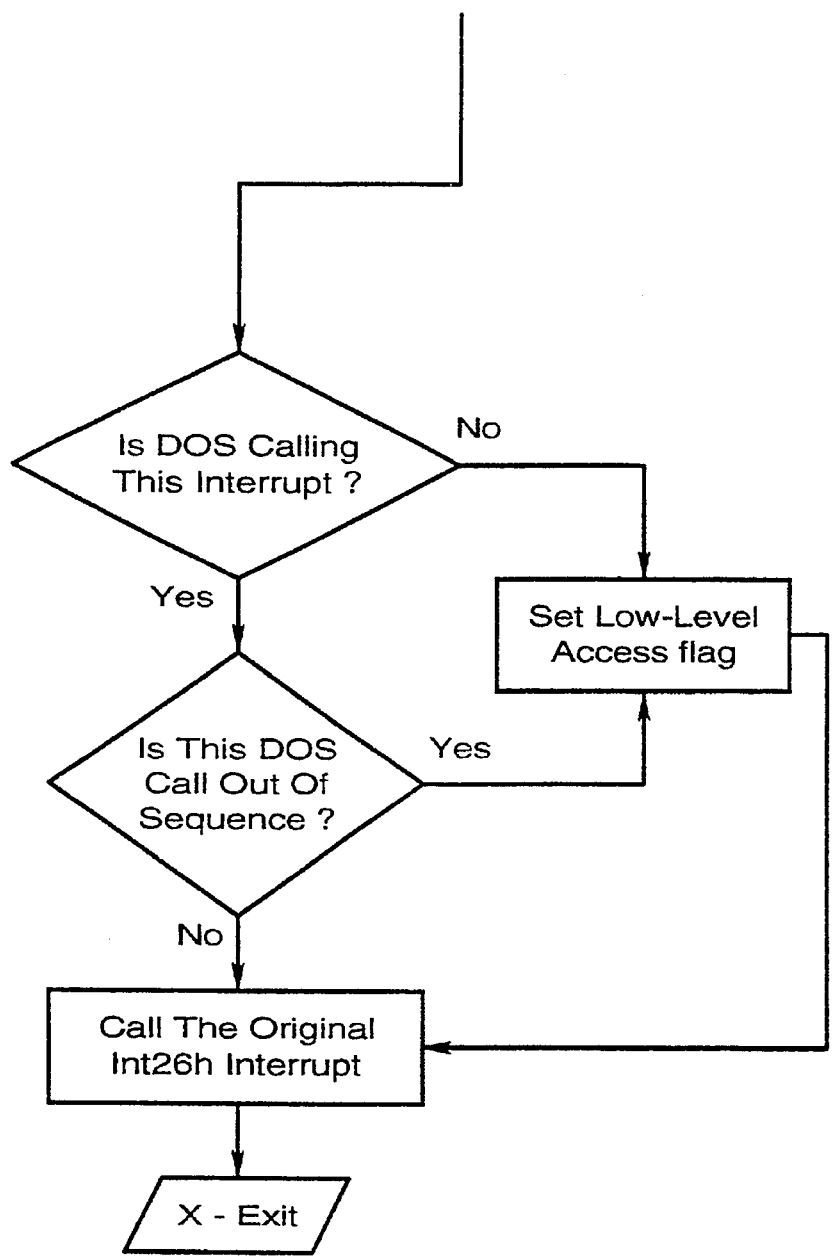
FIG. 14 is a flowchart of a DOS "26H" Intercept.
Figure 15:
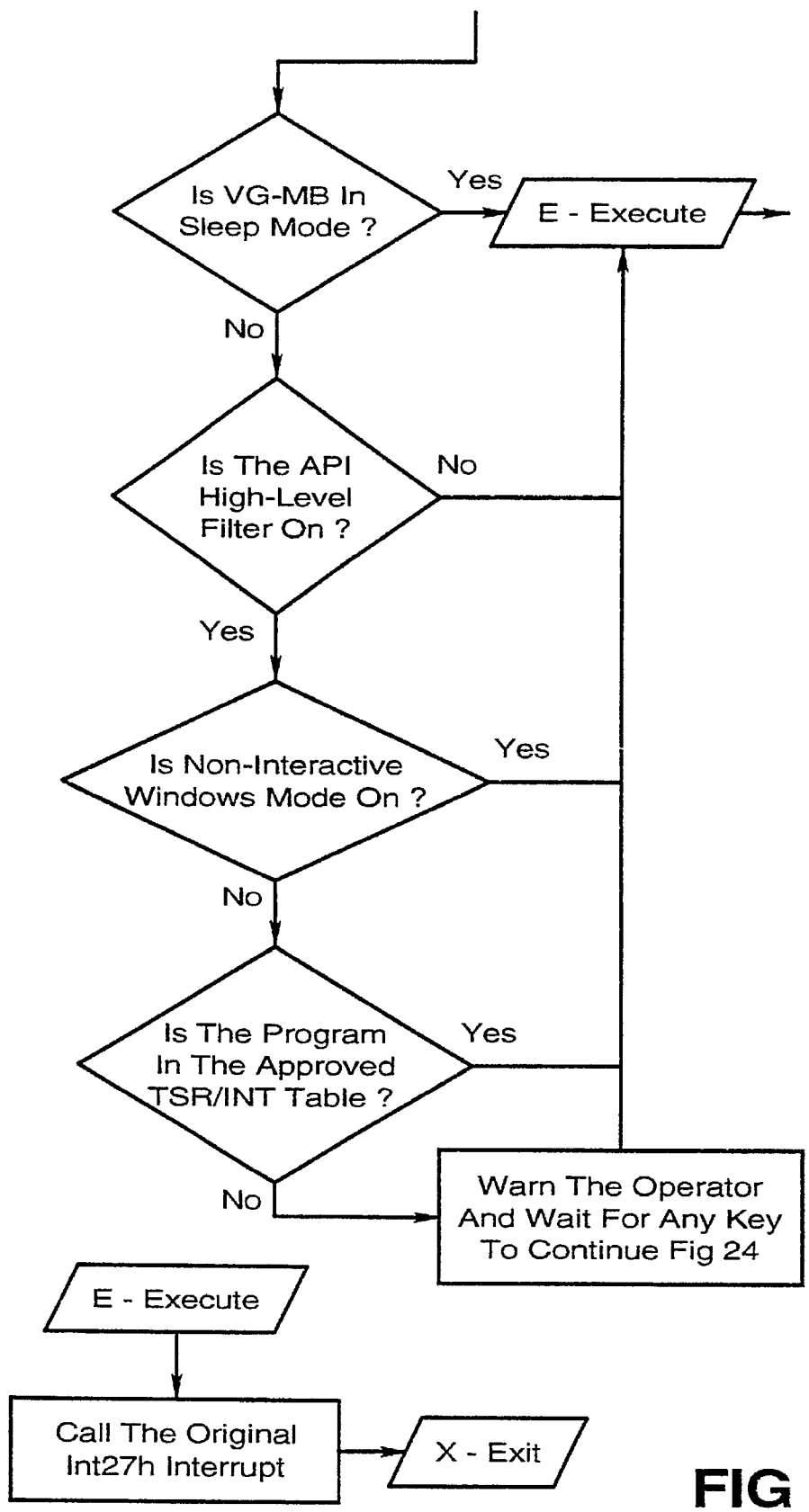
FIG. 15 is a flowchart of a DOS "27H" Intercept.
Figure 16:
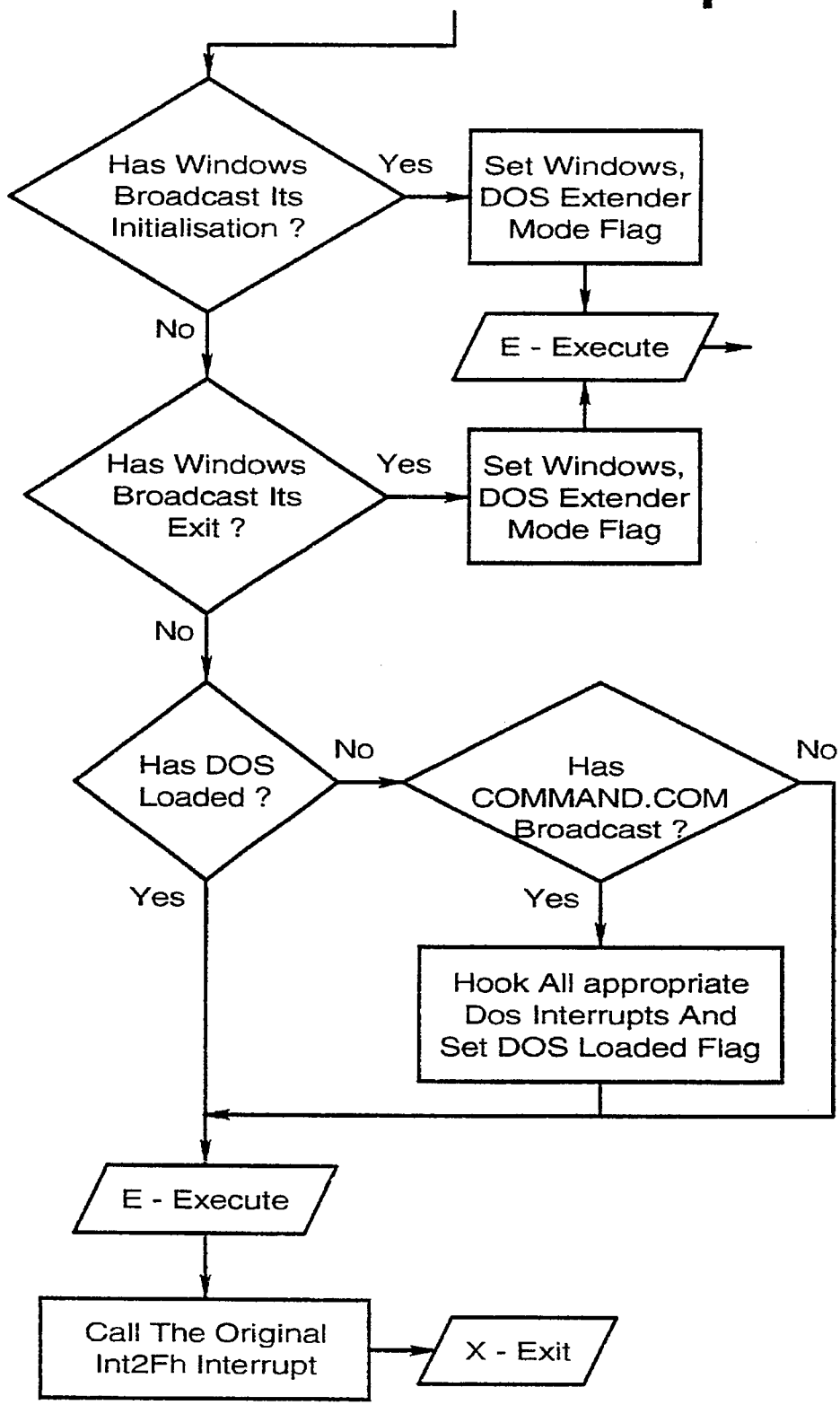
FIG. 16 is a flowchart of a DOS "2FH" Intercept.
Figure 17:
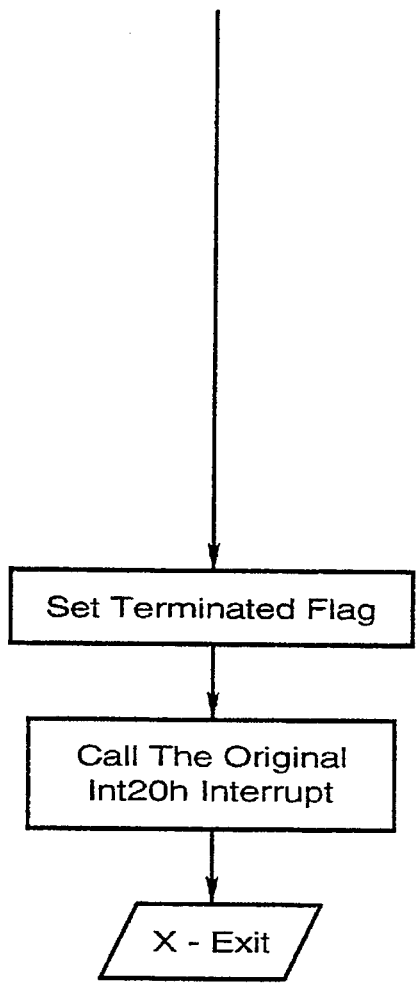
FIG. 17 is a flowchart of a DOS "20H" Intercept.
Figure 18:
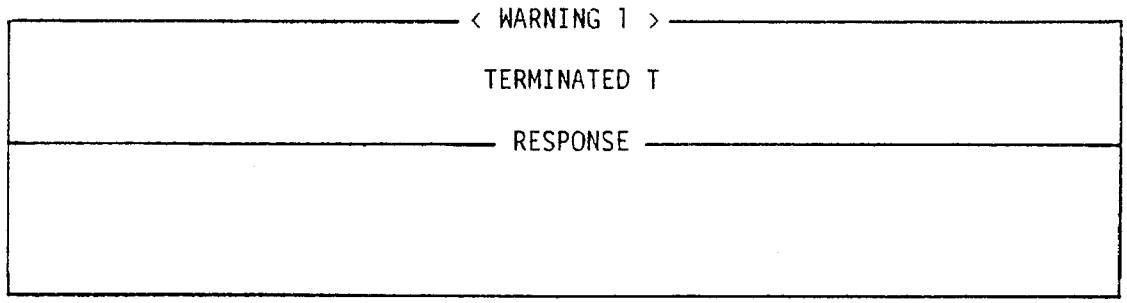
Figure 19:
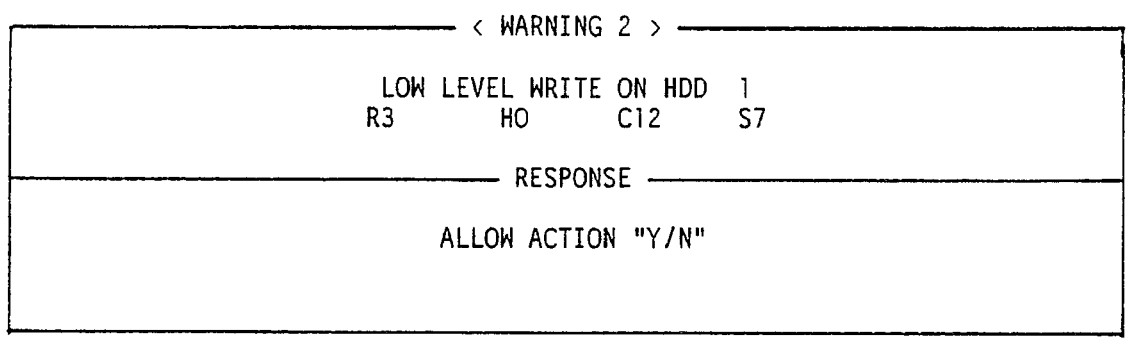
Figure 20:
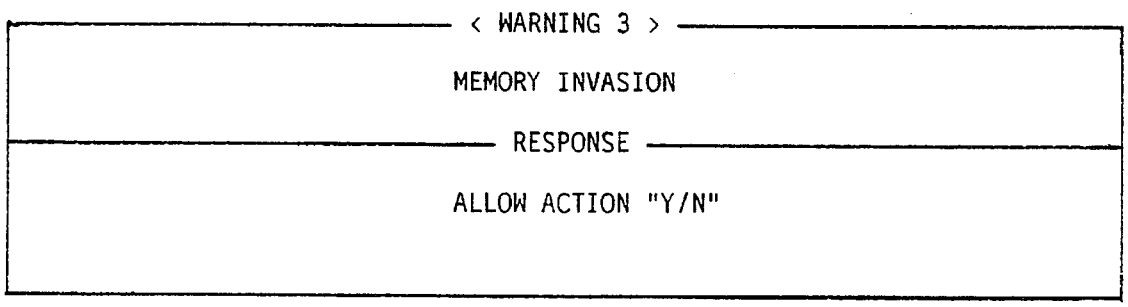
Figure 21:
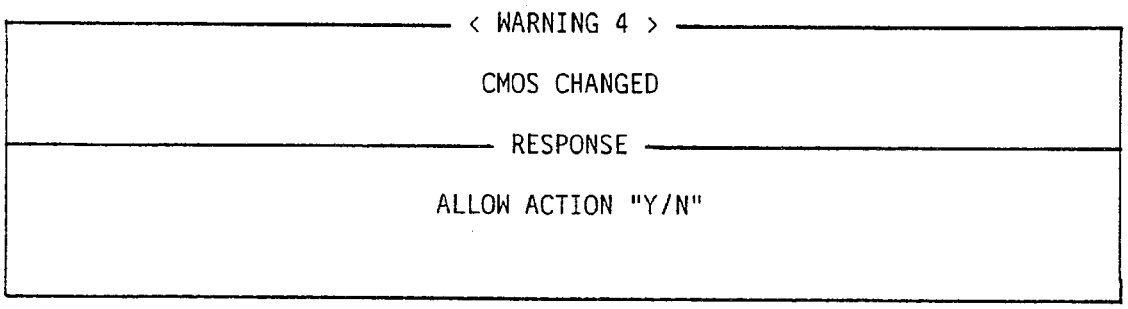
Figure 30:
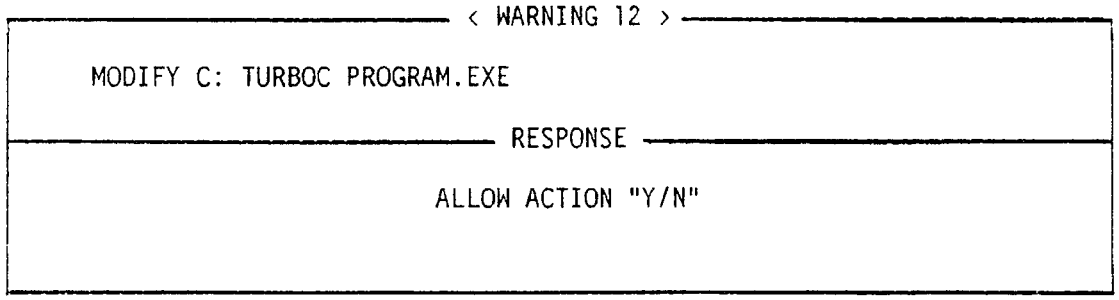
Figure 31:
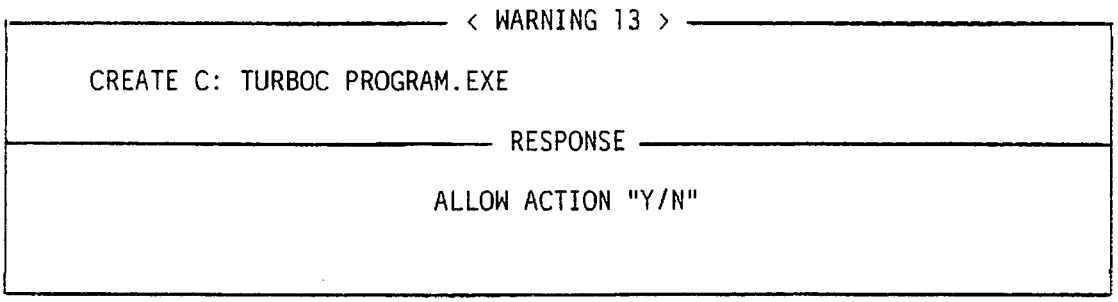
Figure 32:
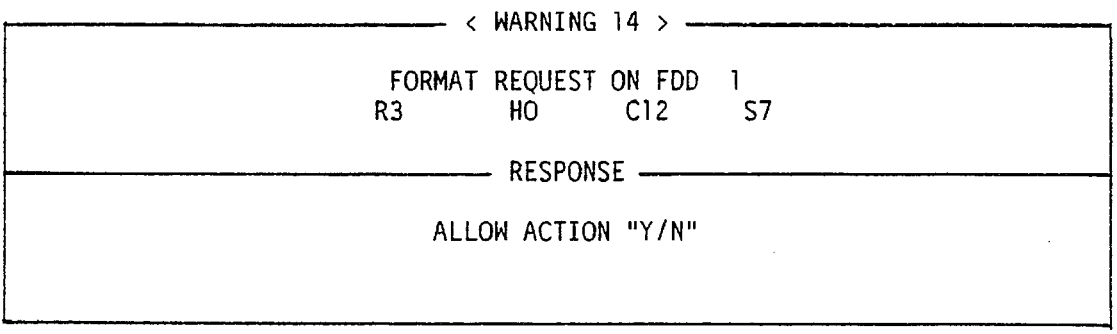
Figure 33:
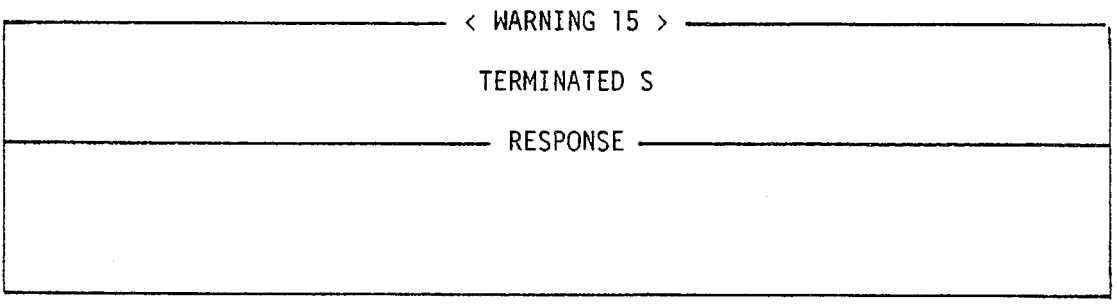

FIG. 10 shows the optional intercept, INT 09H, for the internal function requests vector of the computer keyboard 36. This intercept has the ability to lock keyboard function to prevent further manipulation by unauthorized users. The VG-MB 100 probes the BIOS data area for keyboard status.

FIG. 11 shows the intercept, INT 13H, for the diskette service data definitions vector which is applicable for the operation of floppy disks. This is particularly relevant as viral infections can enter into a computer system via one floppy disk, and exit the same system, so as to further multiply themselves via other floppy disks.

FIGS. 13, 14, 15, 16 and 17 show respectively the INT 21H, INT 26H, INT 27H, 2FH and 20H intercepts for DOS functions which monitor DOS for a number of unspecified data changes.

Other interrupts that can be intercepted include:
INT 09H—optional keyboard;
INT 16H—optional keyboard in refined mode;
INT 10H—optional BIOS video;
INT 01H—optional debug;
INT 03H—optional debug;
INT 24H—error handler for DOS—watched but not intercepted;
INT 3F—this is the last interrupt at the end of Phase 2 of BIOS loading of DOS (see FIG. 8) and represents a watchdog for that stage of DOS loading—watched but not intercepted.

FIGS. 36 to 48 show various setup menus for the VG-MB 100 and VG-DB 200 including change of password (Setup "1", "2", "3"), optional control for the probed addresses on the VG-DB 200, calls to files that do not trigger the VG-MB 100 (Setup "5"), files approved for TSR (terminate and stay resident) and INT 21H (Setup "6"), files permitting low level access (Setup "7"), and other initialization requirements (Setup "8"–"13").

Figure 4:
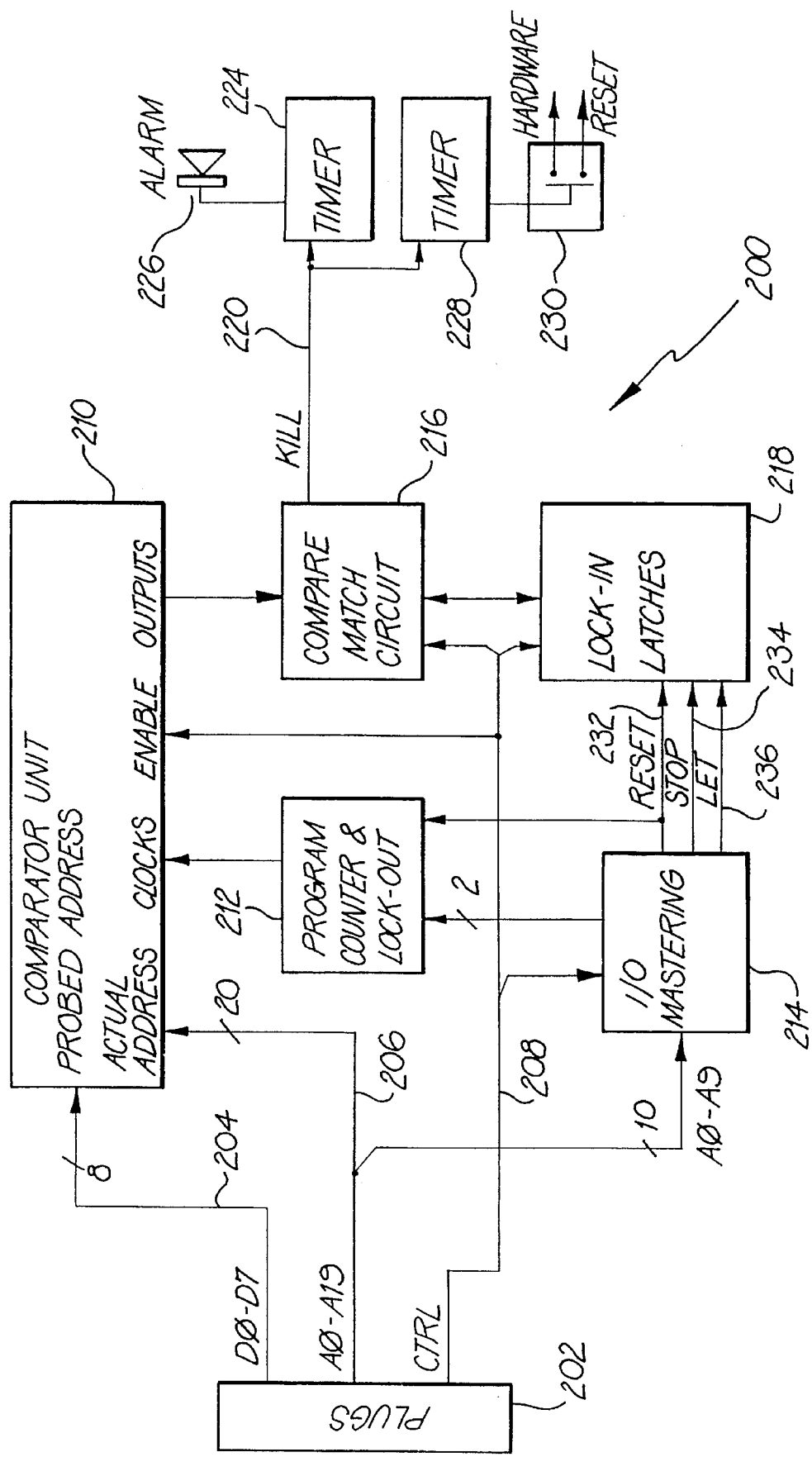
FIG. 4 is a block diagram representation of the virus protection device daughterboard (VG-DB) seen in FIG. 1 of another embodiment.

Turning now to FIG. 4, the VG-DB 200 is shown which connects to the VG-MB 100 of FIG. 3 via plugs 202 which are insertable into the connector sockets 150. Extending from the plugs 202 is an address bus 204 which supplies a probed address input of a comparator unit 210. An address bus 206 extending from the plugs 202 provides an actual address input of the comparator unit 210.

Also connected to the address bus 106 is an I/O mastering unit 214 which regulates the operation of the VG-DB 200. The I/O mastering unit 214 outputs to a program counter and lock-out circuit 212 which supplies various clock signals for the operation of the comparator unit 210. The I/O mastering unit 214 also outputs various control signals to a series of lock-in latches 218 which permits various operational states to be held.

The comparator unit 210 includes a number of outputs which supply a compare match circuit 216 which is configured to determine the particular status of an address access. The compare match circuit 216 interacts with the lock-in latches 218 to permit holding of a particular state. The compare match circuit 216 outputs a kill signal 220 to two timers 224 and 228 which operate simultaneously. The timer 224 sounds an audio alarm 226 for a predetermine period of time, generally 12 seconds, whilst the timer 228 is configured to provide an immediate hardware reset using a relay 230. The relay 230 is held closed for a period of time to allow the hardware reset to be effected and then removed so as to permit normal operation through the re-establishment of BIOS as in FIG. 8. A semiconductor switch can be used as an alternative to the relay 230.

In this manner, the VG-DB 200 can be programmed to selectively monitor any address location on the system bus 14 and can thereby detect an unauthorised operation occurring at a particular address location.

Accordingly, the VG-DB 200 is able to immediately cease all operation of, and reset the computer system 10, without any operator interaction, so as to prevent viral contamination of any memory which may not be preventable using the arrangement of the VG-MB 100. The relay 230 is preferably a high speed Reed relay and is held closed for a period of one second determined by the closing period of the timer 228. In the preferred embodiment, this arrangement has the ability of shutting down the operation of the computer system 10 in approximately 25 billionths of a second. The timers 224 and 228 can be approximately configured NE 556 devices or similar.

Figure 5:
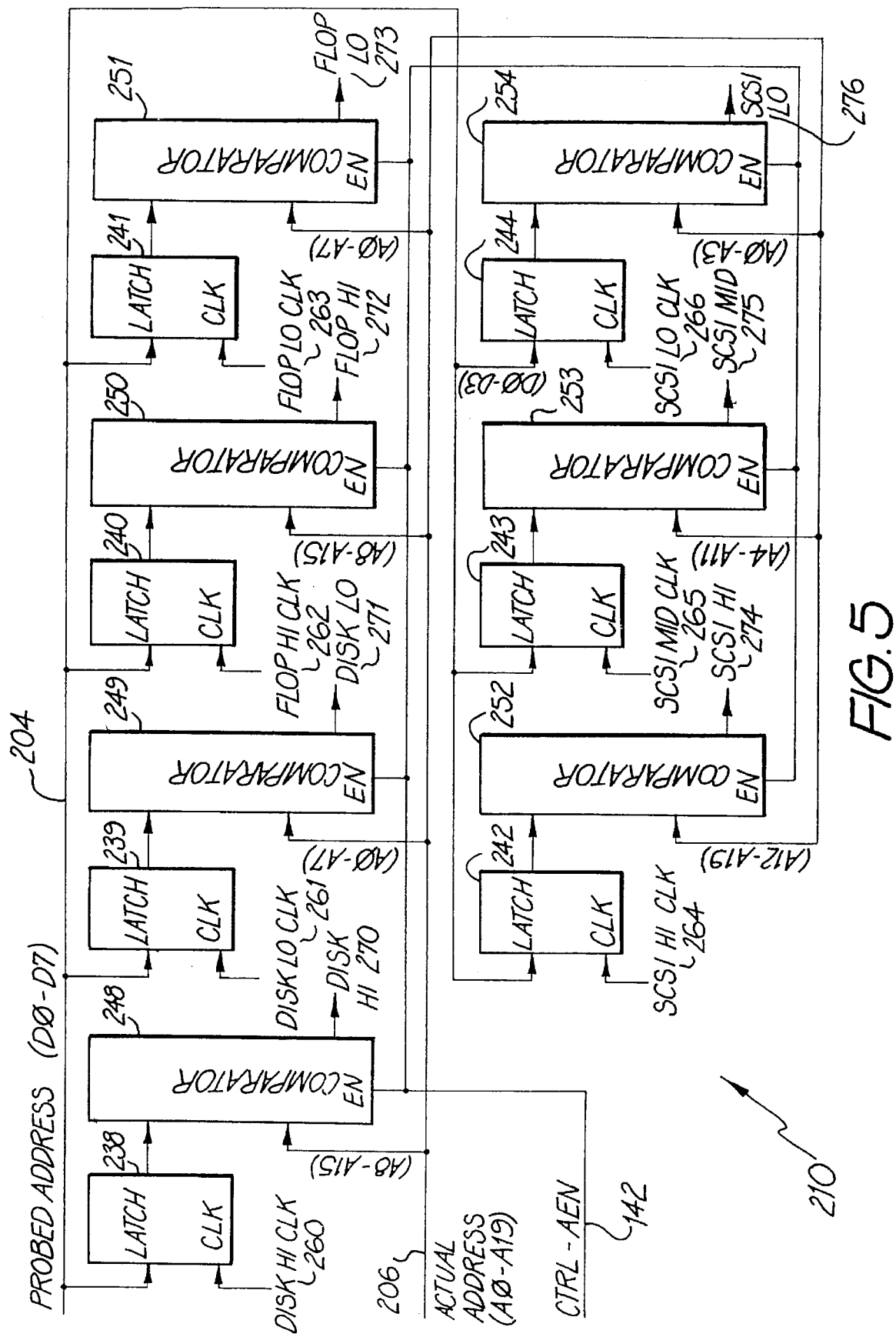
FIG. 5 is a block diagram representation of the comparator unit of FIG. 4.

Turning now to FIG. 5, the arrangement of the comparator unit 210 is shown in which seven latches 238–244 are shown connected to the probe address input comprising the data bus 204. The latches 238–243 buffer each of the 8 data bits representing an address to be probed into a corresponding comparator 248–253. The latch 244 buffers only the 4 least significant bits from the bus 204 into its corresponding comparator 254. Input into each of the comparators 248–254 are various address bits as indicated. The latches 238–244 can be implemented using 74LS374 devices and the comparators using 74LS688 devices. The latch/comparator pairs are configured to make comparisons upon particular address locations throughout the system 10 whereby the probed address is preset by a program operating in the ROM 116 of the VG-MB 100, and the actual address is that being accessed on the system bus 14. In particular, the comparators 248 and 249 access the high and low bytes respectively of the address of the hard disk controller 22. The comparators 250 and 251 access respectively the high and low bytes of the address of the floppy disk controller 26. The comparators 252, 253 and 254 are configured to monitor direct memory access (DMA) via the SCSI port 46 with the comparators 252 and 253 accessing the high and middle bytes and the comparator 254 accessing the lower 4 bits of the SCSI address or any other DMA address determined by ROM 116 (FIG. 3). Each of the comparators 248–254 are enabled from the AEN line 142 of the control bus 208. Also, each of the latches 238–244 is clocked using a clock signal dedicated to the particular address range for which the respective comparator 238–244 has been configured. In this manner, the latch 238 is clocked using a DISK_HI_CLK 260 and the corresponding comparator 248 outputs a DISK_HI 270. A corresponding arrangement is provided for each of the remaining latch/comparator pairs.

Figure 6:
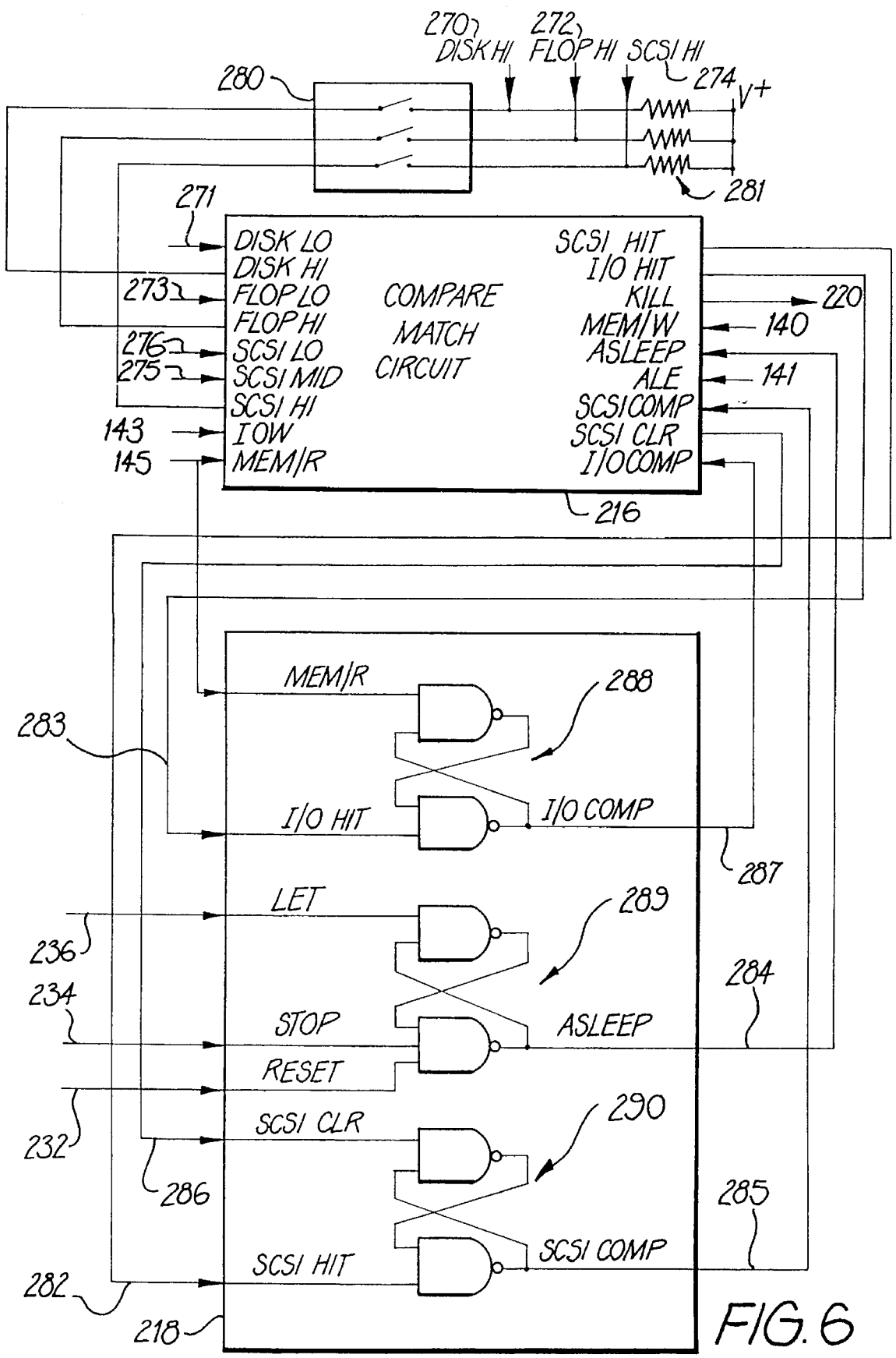
FIG. 6 is a block diagram representation of the compare match circuit and lock-in latches of FIG. 4.

Turning now to FIG. 6, the arrangement of the compare match circuit 216 and the lock-in latches 218 is shown. Each of the outputs (270–276) from the comparator unit 210 output to the compare match circuit 216 with each of the HI byte outputs (270, 272, 274) being passed via a bank 280 of switches which connect to pull-up resistors 281 permitting various preset values to be made. The compare match circuit 216 is also input with signals from the control bus 108 including IOW 143, MEM/R 145, ALE 141, and MEM/W 140.

The compare match circuit 216 is linked with three flip-flops 288, 289 and 290 which form the lock-in latches 218. The flip-flop 288 receives the MEM/R 145 signal together with an I/O HIT signal 283 from the compare match circuit 216. The flip-flop 289 receives a LET signal 236, a STOP signal 234, and a RESET signal 232 each supplied from the I/O mastering circuit 214. The flip-flop 289 outputs an ASLEEP signal 284 to the compare match circuit 216. Lastly, the flip-flop 290 operates for DMA address accesses and receives a SCSI_CLR signal 286 and a SCSI_HIT signal 282 and outputs a SCSI_COMP signal 285 to the compare match circuit 216.

The compare match circuit 216 is preferably formed of a programmable logic array with its various signals having the following logic functions:
SCSI_HIT=(!SCSI_LO) & (!SCSI_MID) & (!SCSI_HI) & (ALE) & (!ASLEEP);
SCSI_CLR=(SCSI_LO & ALE) #(SCSI_MID & ALE) #(SCSI_HI & ALE):
I/O_HIT=(!DISK_LO & !DISK_HI & ALE & !ASLEEP) #(!FLOP_LO & !FLOP_HI & ALE & !ASLEEP);
KILL=(SCSI_COMP & !MEM/W) #(I/O_COMP & !IOW) #(SCSI_COMP & !MEM/R);
where #=OR, &=AND, !=NOT.

It will be apparent from the above logic functions of the compare match circuit 216, that the VG-DB 200, through the comparators 210, monitors accesses (both read and write) to 3 selected memory locations: one in the hard disk controller 22; one in the floppy disk controller 26; and one DMA location. The KILL signal 220 is asserted only on a write to either disk controller 22, 26 or, on either a read or write via DMA.

The actual address locations probed by the VG-DB 200 vary according to the particular application. For the three selected memory locations above, they are dynamically configured during initialization of the VG-DB 200 by the VG-MB 100. The VG-MB 100 analyses the type of machine (e.g. IBM PC/AT/XT, etc.) into which it is installed to determine the address locations of the hard disk controller 22, floppy disk controller 26, and I/O 46 cards and establishes default probe addresses accordingly. The user has the option to select his own addresses. Also SCSI-type drives generally use DMA in which packets of data in memory are accessed via a premable header containing SCSI request commands. Alternatively, simple DMA can occur where a processor other than the main processor 12 has direct access to the bus 14.

Figure 7:
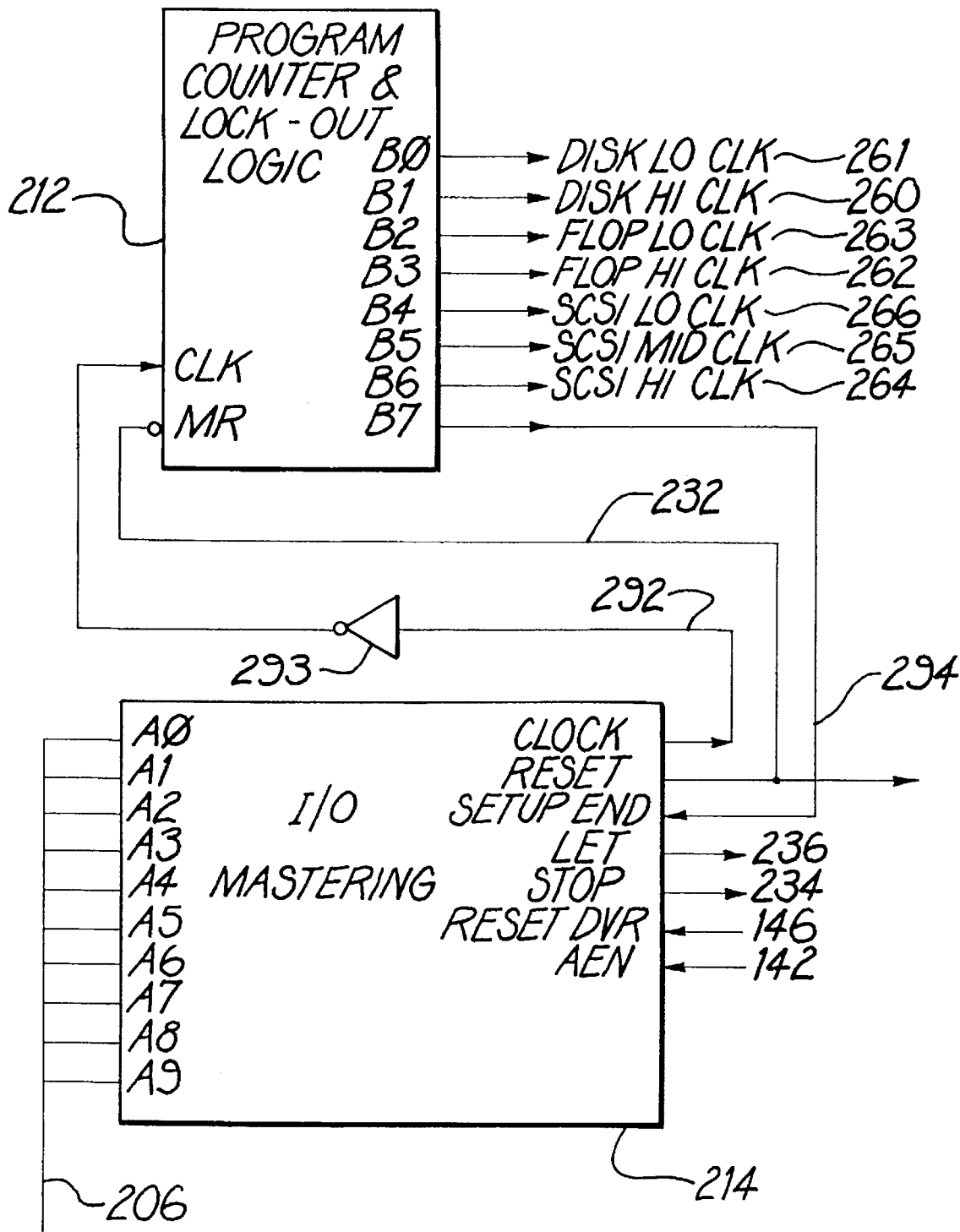
FIG. 7 is a block diagram representation of the program counter and lock-out circuit and the I/O mastering circuit of FIG. 4.

Turning next to FIG. 7, shown is the arrangement of the I/O mastering unit 214 and the program counted lock-out logic 212. The program counter 212 is an 8-bit binary counter such as a 74LS164 device which receives a CLOCK signal 292 and the RESET signal 232 from the I/O mastering unit 214. The program counter 212 outputs the various clock signals 260–266 to the comparator circuits 210. The highest bit (B7) of the program counter 212 provides a SETUP_END signal 294 which is returned to the I/O mastering unit 214.

The I/O mastering unit 214 is input with the lowest 10 bits of the address bus 206 as well as the RES_DVR signal 146 and the AEN signal 142. The I/O mastering circuit 214 outputs a LET signal 236, and a STOP signal 234 which, together with the RESET signal 232 supply the lock-in latches 218.

The I/O mastering unit 214 is preferably a programmable logic array which performs the following logic functions:
CLOCK=A9 & !A8 & A7 & A6 & A5 & A4 & A3 & !A2 & A1 & !A0 & !ION & !RES_!SETUP_END & !AEN;
LET=is a combined logic output of the address bus 206, control bus 208 and SETUP_END unique to each example of the VG-DB 200 which permits (lets) an operation to occur;
STOP=is a combined logic output of the address bus 206, control bus 208 and SETUP_END unique to each example of the VG-DB 200 which prevents (stops) an operation from occurring;
RESET=RES_DRV;
where #=OR, &=AND; !=NOT.

The specific logic functions for LET and STOP are not shown as these are selectable and their specific disclosure herein will enable the bypassing of the VG-DB 200.

Figure 35A:
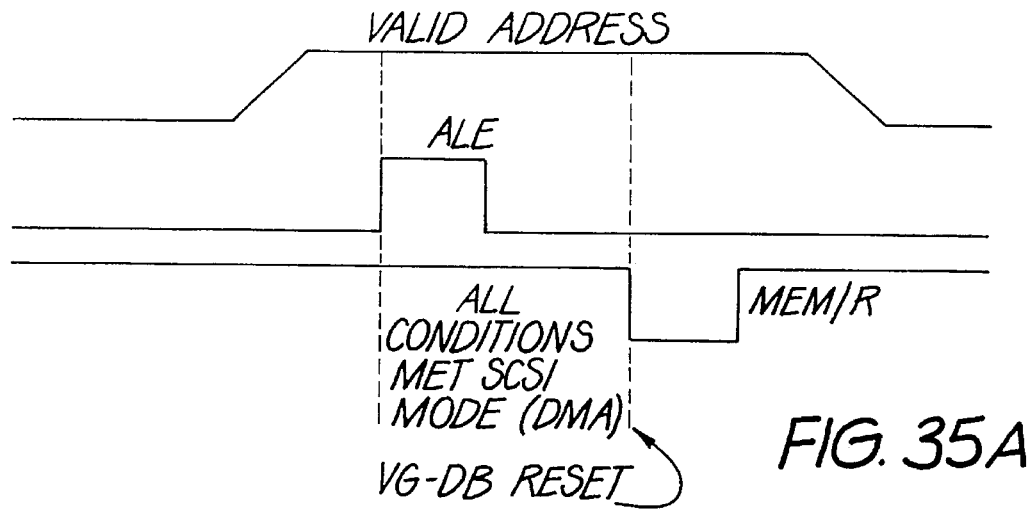
FIGS. 35A, 35B and 35C is a timing diagram of the operation of the daughterboard.
Figure 35B:
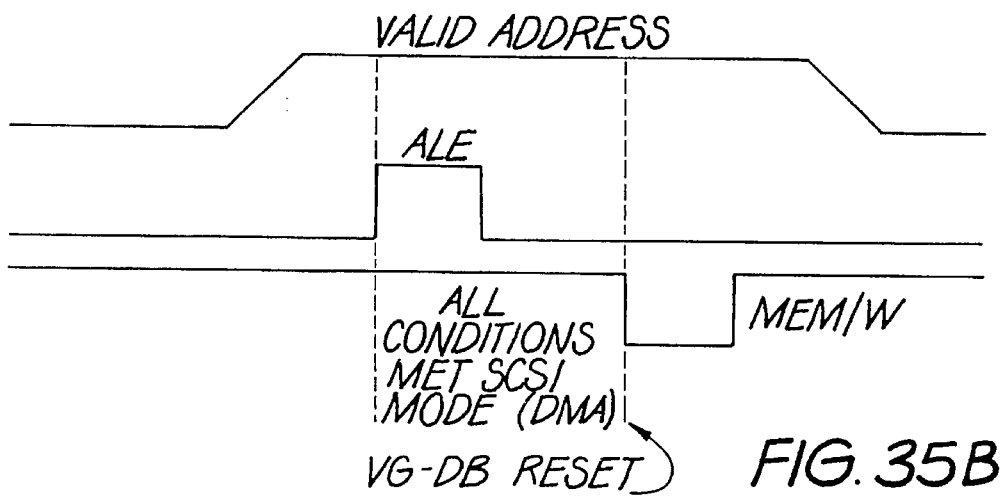
Figure 35C:
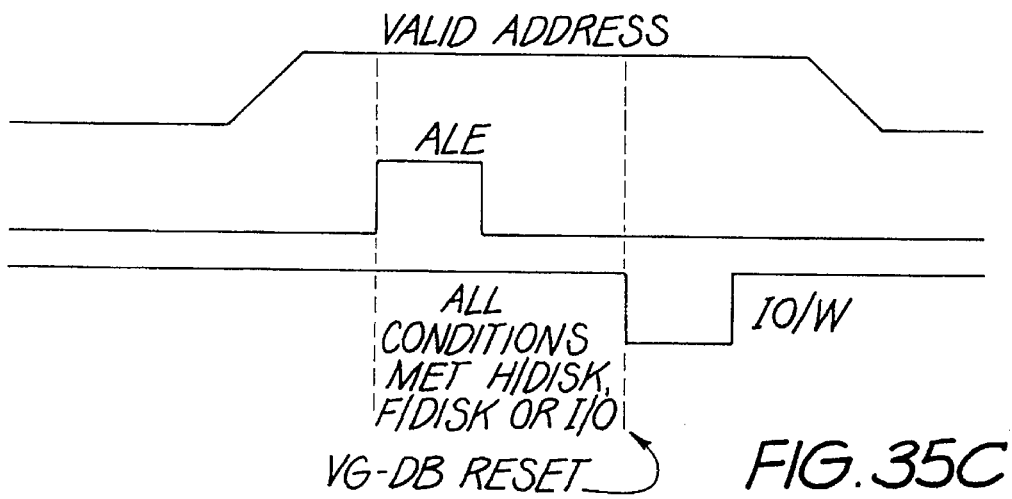
Figure 45:
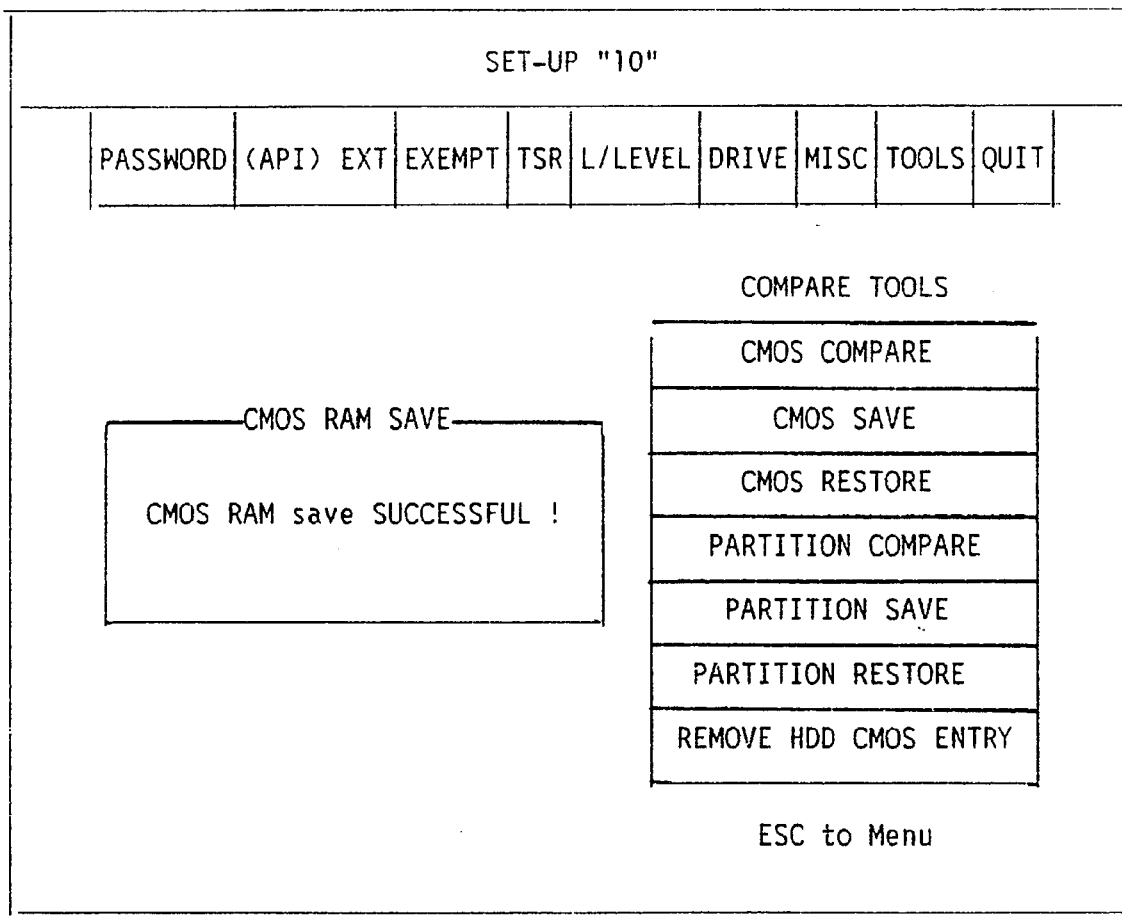
Figure 46:
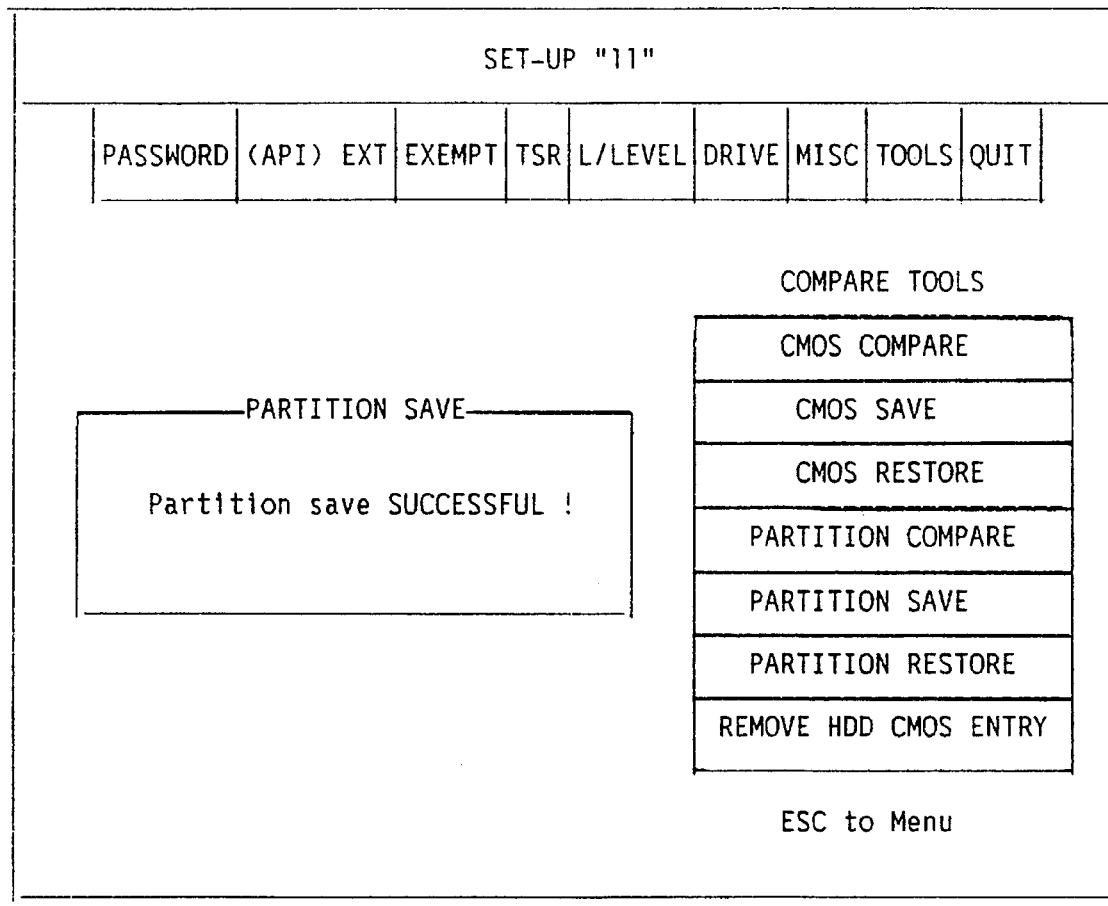
Figure 47:
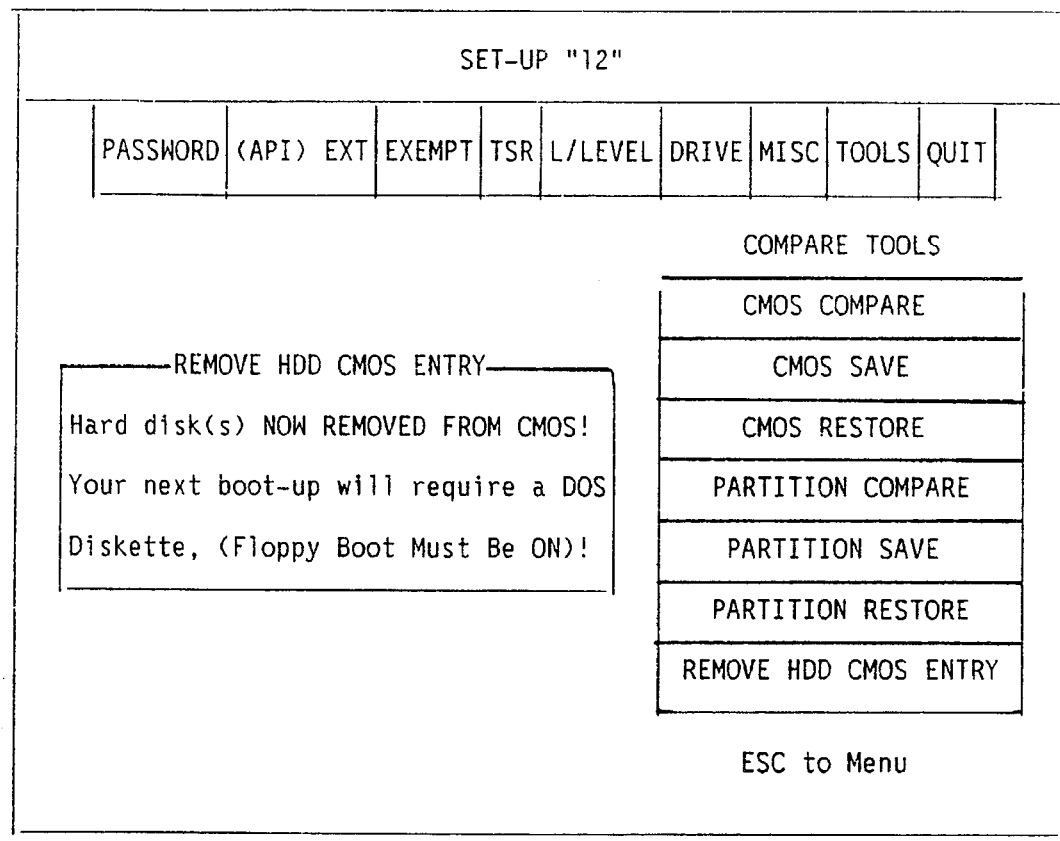
Figure 48:
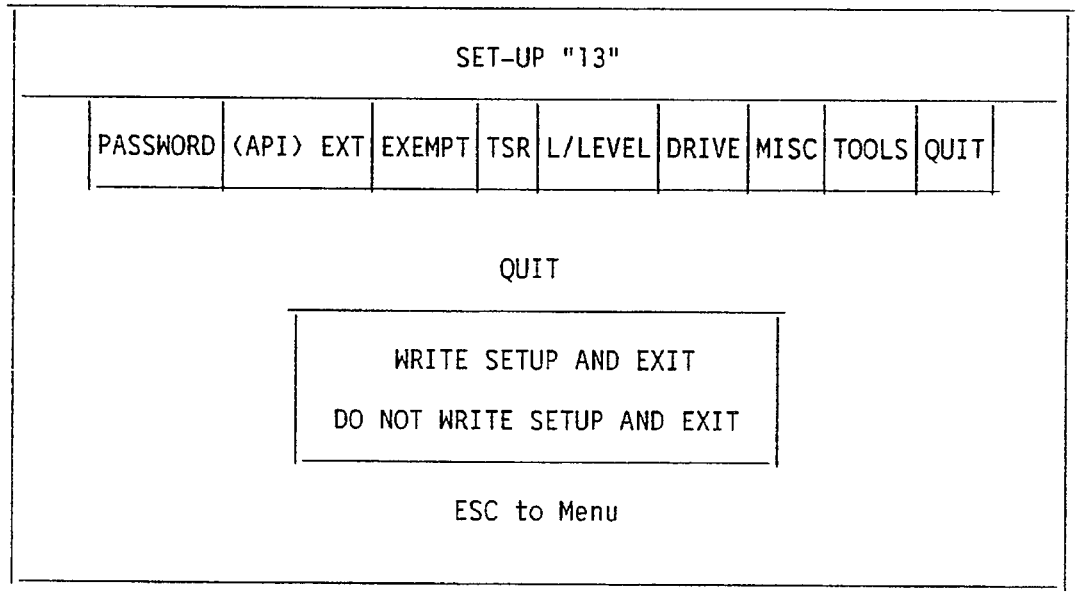

Returning to FIGS. 4 and 5, the probed address locations in the VG-DB 200 can be preset within the ROM 116 and programmed during initialization of the VG-MB 100. In this manner, where a memory access is made on the system bus 14 that is not approved by the VG-DB 200, for example through DMA, the VG-DB 200 can detect this and shut down the system 10 prior to a read or write occurring from that address. In this manner, the VG-DB 200 is configured to take action whilst an address is asserted (AEN 142), and before a read/write operation is commenced by asserting by either of the lines 140, 143, 144 or 145. Such an arrangement is shown in FIGS. 35A, 35B and 35C where the VALID ADDRESS represents a valid output of the comparator 210 prior to processing by the compare match circuit 216 which performs comparisons of the signals shown in FIGS. 35A, 35B and 35C.

Furthermore, the comparators 210 can be periodically reprogrammed, with successive cycles of the respective clock signals output from the program counter 212, with different probe addresses thereby permitting the VG-DB 200 to continually scan address in the computer system 10 for unauthorised memory access. In this manner, the VG-DB 200 is dynamically reconfigurable.

It will be apparent from the foregoing that the VG-MB 100 and the VG-DB 200 operate independently of each other and thus can be configured separately. In such a case the VG-DB 200 requires a dedicated ROM to perform the probe address programming which is performed in the preferred embodiment by the ROM 116. Furthermore, the VG-DB 200 operates entirely without reliance upon the computer system.

Also, it will be apparent that the feature of the hardware reset of the VG-DB 200 can be incorporated into the VG-MB 100 to cause a reset upon a particular interrupt being received. Similarly, the interrupt features of the VG-MB 100 can be incorporated within the VG-DB 200 and implemented upon access to a probed address.

The flowcharts of FIGS. 8–17 and the warning displays of FIGS. 18–33 are indicative of only a number of procedures whereby viral damage can be prevented. Those skilled in the art will appreciate that other interrupt vectors can also be accessed so as to monitor computer functions which can also indicate viral action.

Also, whilst the preferred embodiment is described with particular reference to the IBM PC/AT personal computers, it will be understood by those skilled in the art that the same principles can be applied to other personal computers and also to major (mainframe) computing systems.

Also, the present embodiment uses 74LS devices which are limited to clock speeds of about 50 MHz. Higher speed operation can be obtained using 74S devices, for example.

The foregoing describes only a number of embodiments of the present invention and modifications, obvious to those skilled in the art, can be made thereto without departing from the scope of the present invention.

I claim:

1. A method of preventing viral disease damage to data stored at a plurality of memory locations dispersed throughout a computer system, said computer system including a microprocessor, an address bus and a data bus interconnecting the microprocessor with at least volatile and non-volatile memory storage locations dispersed throughout said computer system, said method comprising the steps of determining an advance step or steps required to write data to one or more of said memory storage locations, continuously monitoring the operation of said computer system at least via an address bus and said data bus of said computer system to identify if one of said advance step(s) is undertaken, wherein at least one of said determining step and said monitoring step comprises accessing said data bus to ascertain the existence of one of said advance step(s), and before the operation of said computer system continues in the event that one or more of said advance steps is undertaken, checking an intended action to follow said undertaken advance step to determine if said intended action is permitted;

wherein one said advance step is an interrupt service operation involving a memory write operation and said monitoring comprises amending a pointer to said interrupt service operation, said pointer residing at one of said memory locations, to point to a dummy memory location, said amending includes transferring said pointer from said one memory location to said dummy memory location via said data bus, and monitoring a control instruction loaded via said data bus into said dummy memory location to determine if said control instruction implement alteration of data at one of said memory locations.

2. A method as claimed in claim 1 wherein the operation of said computer system is suspended when said advance step is undertaken to permit said checking.

3. A method as claimed in claim 1, wherein said checking comprises the steps of prompting a user of said system to determine if said intended action is permitted.

4. A method as claimed in claim 3, wherein said user can select to either continue said intended action or to halt operation of said computer system.

5. A method as claimed in claim 1 wherein one said advance step is a direct memory access to at least one of said memory locations.

6. A method as claimed in claim 1, wherein one said advance step is a direct memory access to at least one of said memory locations, said determining includes identifying an address of said one memory location using said data bus, and said monitoring comprises the probing of accesses at said memory locations using said address.

7. A method as claimed in claim 6, wherein said checking comprises the steps of comparing said memory locations directly against memory locations addresses in said intended operation and supplying a valid comparison signal upon a valid comparison.

8. A method as claimed in claim 7 wherein said valid comparison signal causes a cessation of said intended operation prior to actual access to one or more of said memory locations.

9. A method as claimed in claim 8, wherein said cessation is achieved through a hardware reset of said computer system.

10. Apparatus for preventing viral disease damage to data stored at a plurality of memory locations dispersed throughout a computer system, said computer system comprising a microprocessor interconnected to said memory locations at least via an address bus and a data bus, said memory locations including volatile and non-volatile memory storage locations, said apparatus comprising:

determining means for determining an advance step or steps required to write data to one or more of said memory storage locations, wherein one said advance step is an interrupt service operation involving a memory write operation;

monitoring means for continuously monitoring the operation of said computer system at least via said address bus and said data bus to identify if one of said advance steps is undertaken, said monitoring means using at least said data bus to amend a pointer to said interrupt service operation, said pointer residing at one of said memory locations, to point to a dummy memory location whereby a control instruction loaded via said data bus into said dummy memory location can be monitored to determine if said control instruction implements alteration of data at one of said memory locations, wherein at least one of said determining means and said monitoring means accesses said data bus to ascertain the existence of one of said advance steps; and checking means for checking, before the operation of said computer system continues in the event that one or more of said advance steps is undertaken, an intended action to follow said undertaken advance step to determine if said intended action is permitted.

11. Apparatus as claimed in claim 10, wherein said attempted accesses are via interrupt service operations and said monitoring means and said checking means comprise a read only memory (ROM), including dummy locations vectored to form interrupt vectors of said system, said ROM suspending said attempted access and displaying a message to a user of said system requesting a determination of whether or not said attempted access is intended.

12. Apparatus as claimed in claim 11, wherein if said attempted access is intended, said ROM returns control to the appropriate interrupt service operation.

13. Apparatus as claimed in claim 11, wherein if said attempted access is not intended, said ROM halts said attempted access.

14. Apparatus as claimed in claim 13, wherein said halting is effected by a lock-up of said computer system.

15. Apparatus as claimed in claim 10, wherein said apparatus is releasably connectable to said computer system.

16. Apparatus as claimed in claim 10, wherein said apparatus is integral with said system.

17. Apparatus as claimed in claim 10, wherein said memory locations are dynamically reconfigurable via said data bus.

18. Apparatus as claimed in claim 10, wherein said monitoring means comprises a plurality of connections to a system bus of said computer system including at least said address bus and said data bus by which accesses to said memory locations are achieved and said memory locations reside in, or are accessible via hardware devices connected to said system bus, said hardware devices being selected from the group consisting of volatile random access memory (RAM), non-volatile RAM, a real time clock, a hard disk drive, a hard disk controller, a floppy disk drive, a floppy disk controller, a video display device, a video controller, a keyboard, a keyboard interface adaptor, a printer, a printer interface adaptor, a data transmitter/receiver, an expansion device, a direct memory access (DMA) port and said apparatus.

19. Apparatus as claimed in claim 10 wherein one said advance step is a direct memory access to at least one of said memory locations, and said determining means further includes identifying means for identifying an address of said one memory location using said data bus, said monitoring means further comprises probing means for probing of accesses at said memory locations using said address, and said checking means further comprises comparing means for comparing said memory locations addressed in said intended action and supplying a valid comparison signal upon a valid comparison.

20. Apparatus as claimed in claim 19 wherein:
said probing means and said comparing means comprise one or more comparators connected to said address bus and said data bus to compare an address on said address bus with an address value supplied by said data bus and representing said memory locations; and
said checking means further comprises logic means for receiving outputs from said comparators and to cross-reference said comparator outputs with control signals of said system indicative of the type of said attempted access.

21. Apparatus as claimed in claim 20 wherein logic means is adapted to cause a reset of said computer system upon determination of a non-permitted attempted access.

22. Apparatus as claimed in claim 21 wherein said reset is a hardware reset and is implemented prior to actual access to one or more of said memory locations.

23. A method of preventing viral disease damage to data stored at a plurality of memory locations dispersed throughout a computer system, said computer system including a microprocessor connected to at least volatile and non-volatile memory storage locations via at least an address bus and a data bus, said method comprising the steps of determining which interrupt vectors of said system are accessed for memory write operations accessing at least said address bus and said data bus to amend pointers in said volatile memory storage locations that point to said interrupt vectors to point to a corresponding number of dummy memory locations and subsequently monitoring via at least said data bus, control instructions as they are loaded into said dummy memory locations to determine if said control instructions are to implement alteration or deletion of memory, whereby if said control instructions are such that an alteration or deletion of memory will be caused, further processing of said control instructions is suspended and a message is provided to a user of said system demanding action so as to prevent or allow further processing, the prevention of further processing thereby preventing unintentional alteration or deletion of said memory, and
wherein said dummy memory locations reside in random-access memory (RAM) at which data used to call a corresponding interrupt service operation is temporarily stored, while a read-only-memory (ROM), that incorporates instructions permitting the determination, in concert with said computer system, determines if said instruction will cause said alteration or deletion.

24. A method as claimed in claim 23, said method comprising the further steps of monitoring selected ones of said locations at least via said address bus and said data bus, for an attempted access threat and interrupting the operation of said system upon detection of at least one said attempted access.

25. A method as claimed in claim 23, wherein if said user allows further processing, said system under control of said ROM re-vectors said data stored in said dummy memory locations to the true pointer for said interrupt vector.

26. A method as claimed in claim 25 wherein said accesses are instigated by said microprocessor and a device external to said computer system and interfaced thereto.

27. Apparatus for preventing viral disease damage to data stored at one or more memory locations throughout a computer system, said apparatus comprising:
connection means for connecting said apparatus to a system bus of said computer system, said system bus having control, address and data bus components;
first buffer means for connection to said control and address bus components for buffering said control and address bus components to an address decoder and a comparator means;
said buffer means and transceiver means for connection to said data bus component for interconnecting said data bus component with said comparator means and a memory means respectively, said memory means comprising random access memory (RAM) and read only memory (ROM) addressed via said address decoder;
said comparator means comprising:
a comparator unit having first comparator inputs connected to said address bus component via said first buffer means, second comparator inputs connected to said data bus component via second buffer means and a control input connected to said control bus component,
control means for monitoring said control and address bus components for enabling operation of said comparator unit, via said control input, and an array of latches, said latches being connected to a match circuit to which one or more outputs of said comparator unit is/are attached, and
timer means connected to an output of said match circuit and providing an audible alarm output and a reset output adapted to cause a hardware reset of said computer system, wherein
contained in said ROM is a controlling program which, upon initialization of said computer system, amends pointers in a system memory of said computer system relating to interrupt vectors of said computer system, to point to a corresponding number of dummy locations in said RAM which vector monitoring instructions contained in said ROM, said monitoring instructions enabling determination of whether or not a called interrupt service operation of said computer system is implementing an alteration or deletion of memory, whereby if said instructions are such that alteration or deletion of memory will be caused, further processing is suspended and a message is provided to a user of said system demanding action so as to prevent or allow further processing, the prevention of further processing thereby preventing unintentional alteration or deletion of said memory, and wherein said ROM further contains at least one probe address location which is output therefrom via said transceiver means and said second buffer means and input to said second comparator input of said comparator unit, whereby said first comparator input connected to said address bus component continuously monitors said address bus component and when an address corresponding to said probe address location occurs thereon, an output of said comparator unit goes active indicating an attempted access at said probe address location, said match circuit receiving said active output and comparing said active output with control signals provided by said control means to determine an unauthorized access to said probe address.

28. Apparatus as claimed in claim 27, wherein said attempted access is a write operation to said probe address location.

29. Apparatus as claimed in claim 27, wherein said comparator unit continuously monitors a plurality of different probe address locations.

30. Apparatus as claimed in claim 27, wherein said probe address location is dynamically reconfigurable during operation of said system by of said controlling program.

31. Apparatus for preventing viral damage to data stored at one or more memory locations dispersed throughout a computer system, said computer system comprising at least a controlling processor and a system bus interconnecting said processor with said memory locations, said system bus having control, address and data bus components and said memory locations including a system memory unit, said apparatus comprising: p1 connection means for connecting said apparatus to said system bus;

first buffer means for connection to said control and address bus components for buffering said control and address bus components to an address decoder and a comparator means;

second buffer means and transceiver means for connection to said data bus component for interconnecting said data bus component with said comparator means and a memory means respectively, said memory means comprising random access memory (RAM) and read only memory (ROM) addressed via said address decoder;

said comparator means comprising:

a comparator unit having first comparator inputs connected to said address bus component via said first buffer means, second comparator inputs connected to said data bus component via second buffer means and a control input connected to said control bus component, control means for monitoring said control and address bus components to enabling operation of said comparator unit, via said control input, and an array of latches, said latches being connected to a match circuit to which one or more outputs of said comparator is/are connected, and output means connected to an output of said match circuit and providing an indicia representative of an unauthorized access to at least one of said memory locations, wherein contained in said ROM is a controlling program which, upon initialization of said computer system, amends pointers in said system memory unit relating to interrupt vectors of said computer system, to point to a corresponding number of dummy locations in said RAM which vector monitoring instructions contained in said ROM, said monitoring instructions enabling determination of whether or not a called interrupt service operation of said computer system is implementing an alteration or deletion of memory, whereby if said instructions are such that alteration or deletion of memory will be caused further processing is suspended and a message is provided to a user of said system demanding action so as to prevent or allow further processing, the prevention of further processing thereby preventing unintentional alteration or deletion of said memory, and wherein said ROM further contains at least one probe address location which is output therefrom via said transceiver means and said second buffer means and input to said second comparator input of said comparator unit, whereby said first comparator unit connected to said address bus component continuously monitors said address bus component and when an address corresponding to said probe address location occurs thereon, an output of said comparator unit goes active indicating an attempted access at said probe address location, said match circuit receiving said active output and comparing said active output with control signals provided by said control means to determine an unauthorized access to said probe address location, whereby the status of said control signals is stored in said latches and said match circuit, and upon determining an unauthorized access, said match circuit outputs a signal to said output means to cause output of said indicia.

32. Apparatus as claimed in claim 31 wherein said output means provides an audible alarm output and a reset output adapted to cause a hardware reset of said computer system during said attempted access but before actual memory access actually occurs.

* * * * *